Figure 1:
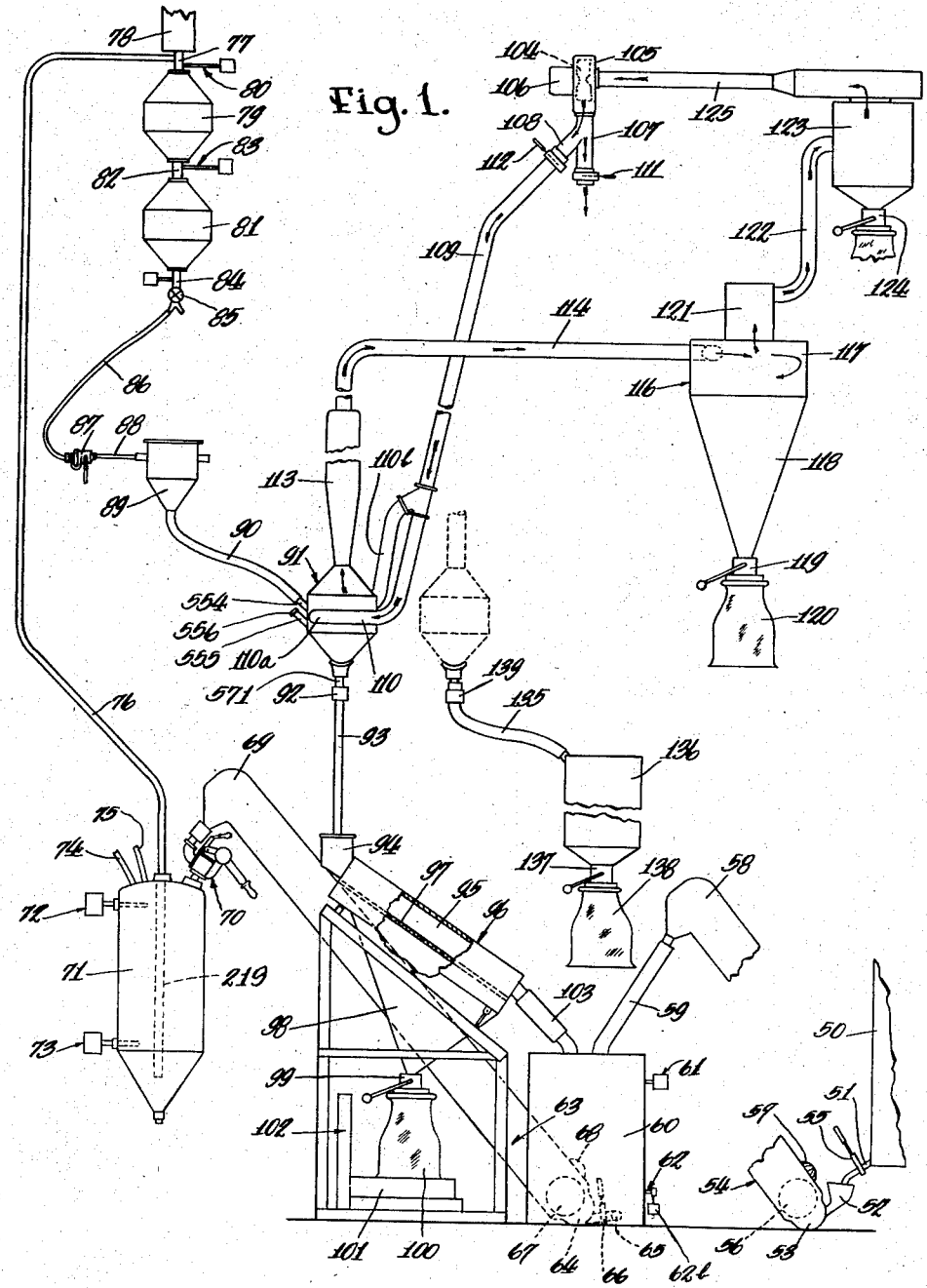

Oct. 23, 1945.  E. L. WIEGAND  2,387,548
PROCESSING OF MATERIALS
Original Filed Dec. 7, 1939    7 Sheets—Sheet 1

Edwin L. Wiegand
INVENTOR
By Freeman, Sweet, and Albrecht
ATTORNEYS

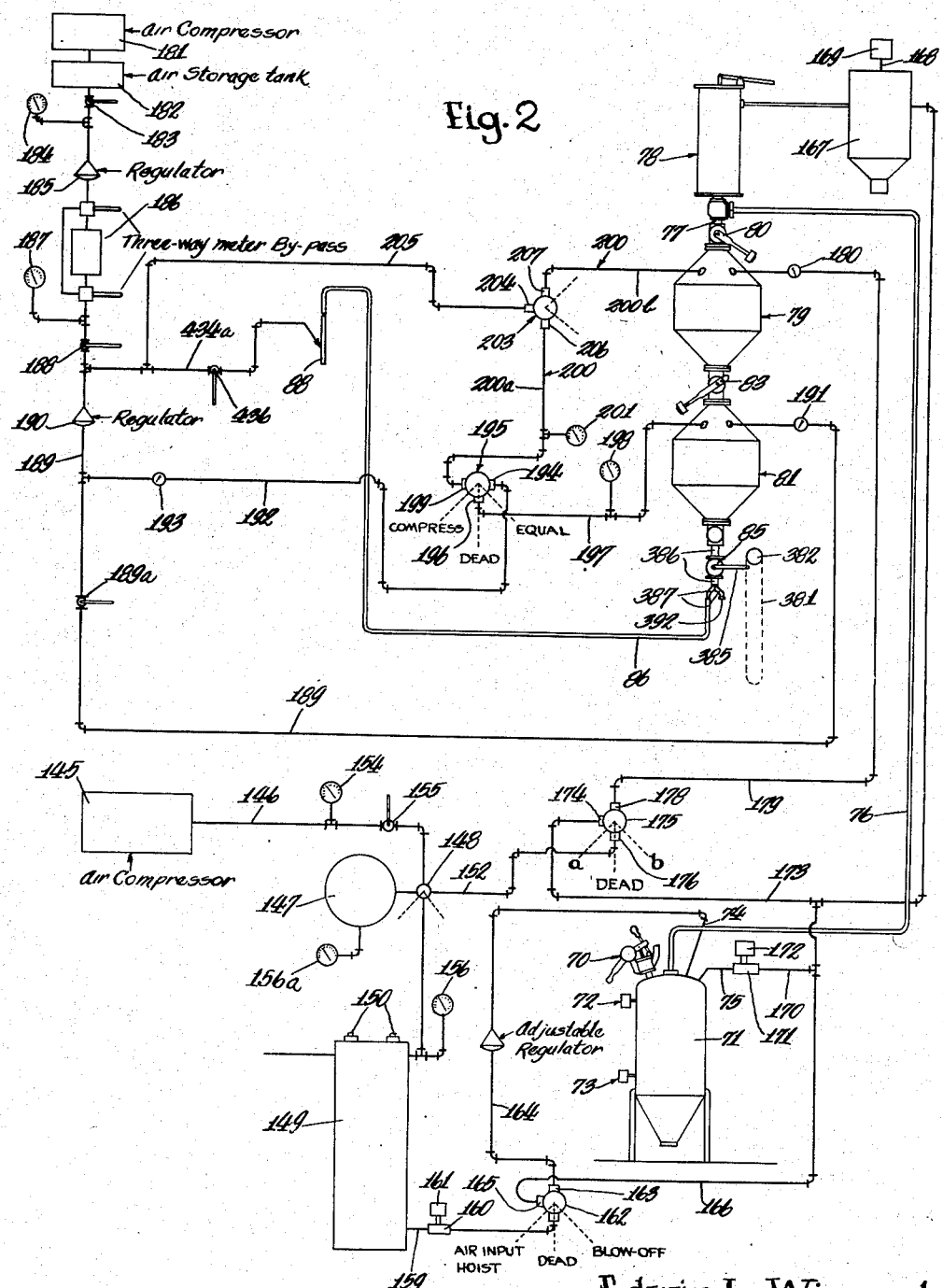

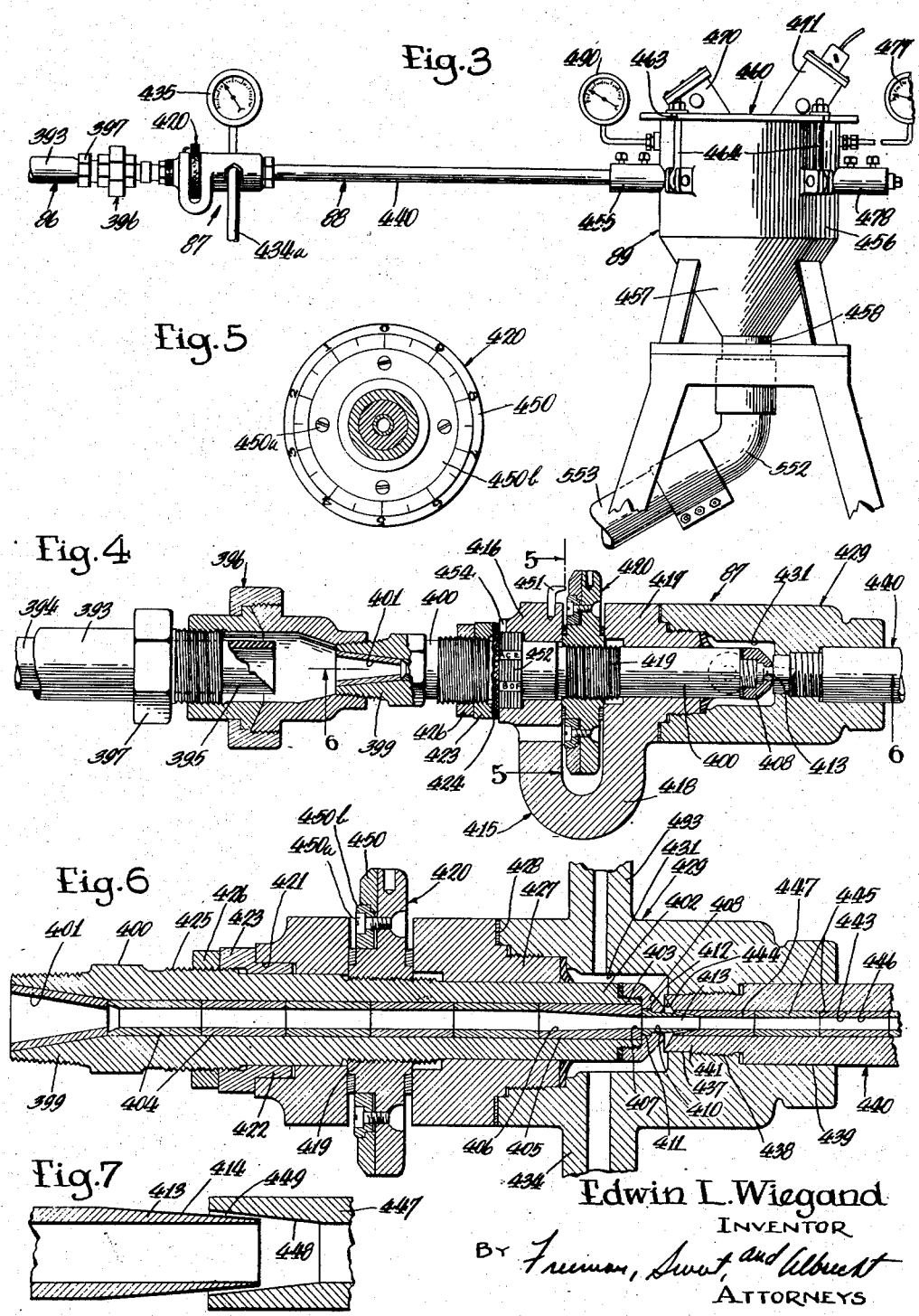

Oct. 23, 1945.   E. L. WIEGAND   2,387,548
PROCESSING OF MATERIALS
Original Filed Dec. 7, 1939   7 Sheets-Sheet 4
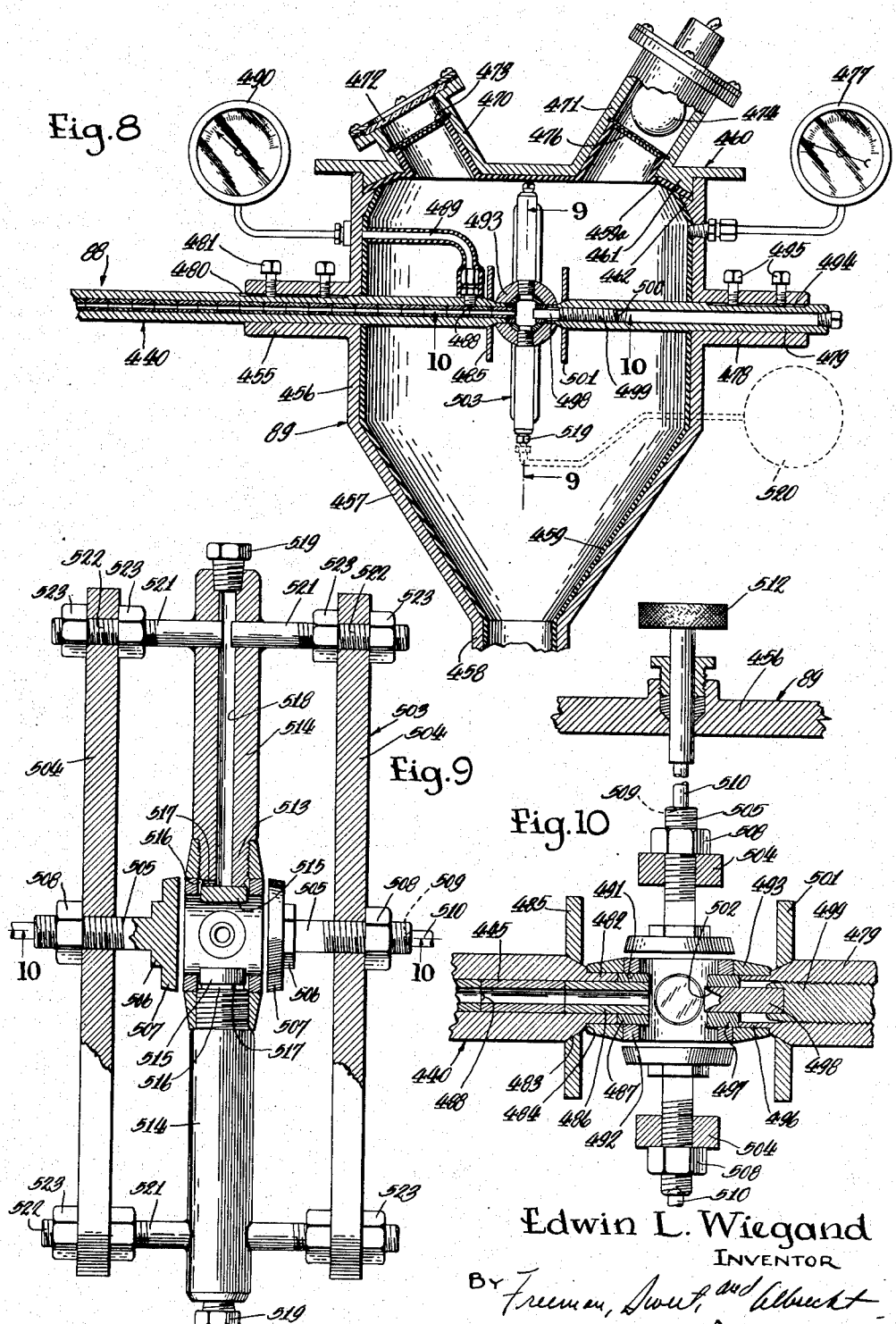
Edwin L. Wiegand
INVENTOR
By Freeman, Swartz, and Albrecht
ATTORNEYS Oct. 23, 1945. E. L. WIEGAND 2,387,548
PROCESSING OF MATERIALS
Original Filed Dec. 7, 1939 7 Sheets-Sheet 5

Edwin L. Wiegand
INVENTOR

BY Freeman, Swat, and Albert
ATTORNEYS

Oct. 23, 1945. E. L. WIEGAND 2,387,548
PROCESSING OF MATERIALS
Original Filed Dec. 7, 1939 7 Sheets-Sheet 6
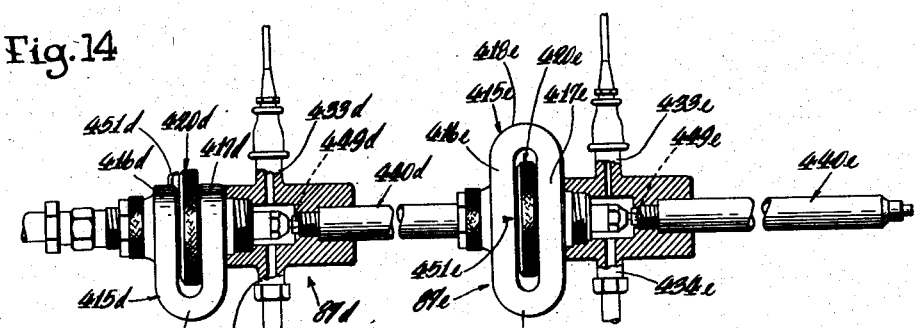
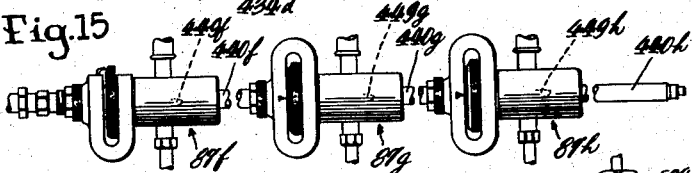
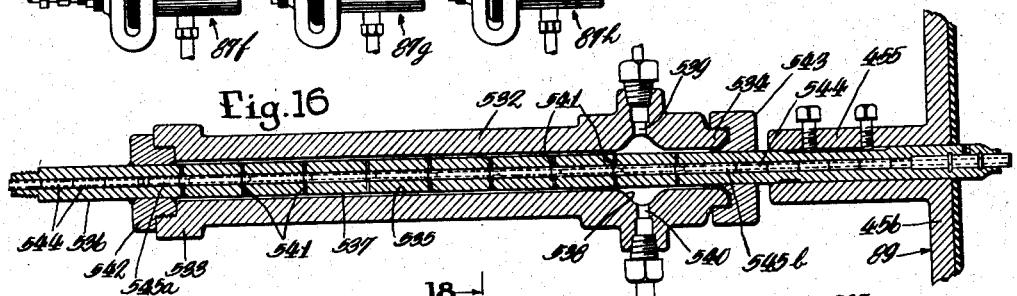
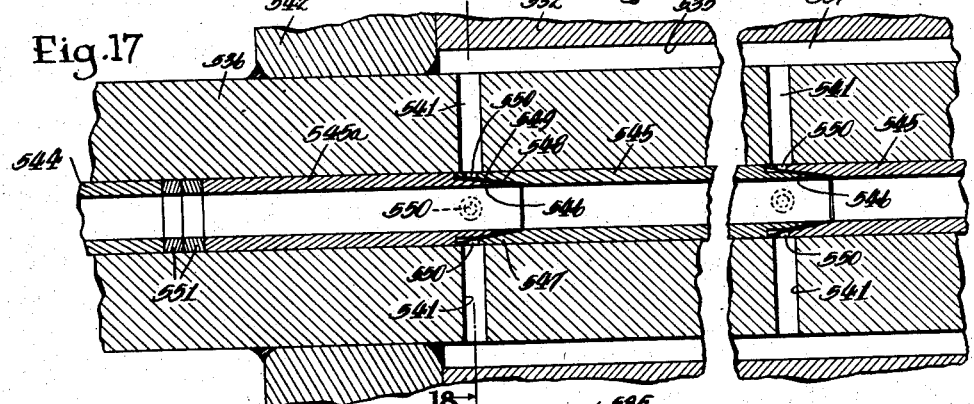
Edwin L. Wiegand
INVENTOR
By Freeman, Swift and Albrecht
ATTORNEYS Oct. 23, 1945.  E. L. WIEGAND  2,387,548
PROCESSING OF MATERIALS
Original Filed Dec. 7, 1939   7 Sheets-Sheet 7
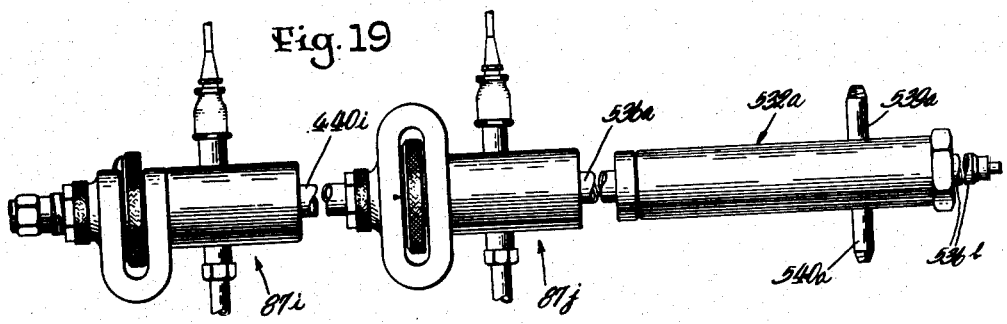
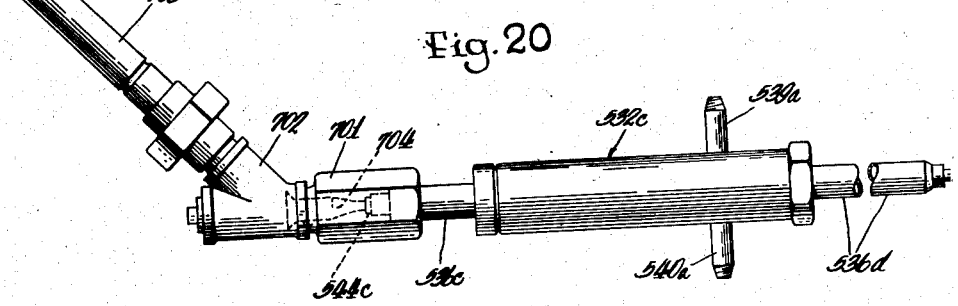
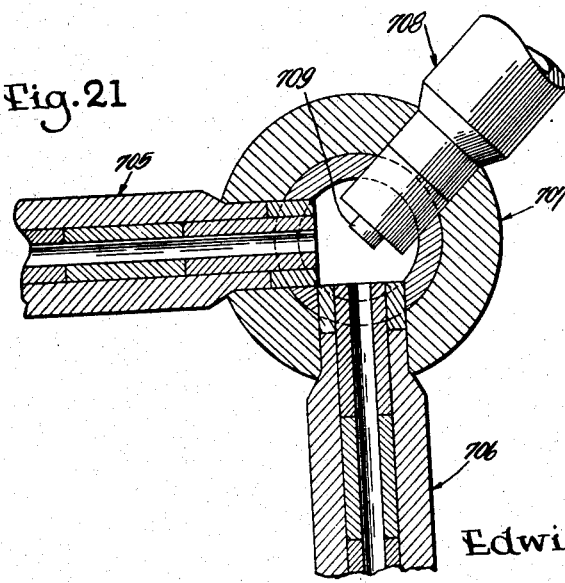
Edwin L. Wiegand
INVENTOR
BY Freeman, Sweet, and Albrecht
ATTORNEYS Patented Oct. 23, 1945

2,387,548

UNITED STATES PATENT OFFICE 2,387,548

PROCESSING OF MATERIALS

Edwin L. Wiegand, Pittsburgh, Pa., assignor to Orefraction Incorporated, Pittsburgh, Pa., a corporation of Pennsylvania Original application December 7, 1939, Serial No. 308,002. Divided and this application October 24, 1940, Serial No. 362,563

31 Claims. (Cl. 241—5)

My invention relates to the processing of materials, and more particularly, the processing of material from an unground state to a ground product or to several separated ground products, and the grinding of materials. With respect to the grinding of materials, the invention involves the projection of a stream of fluid and material particles moving at high velocity against an anvil or against a counter-stream of particles. The principal objects of the invention are the improvement of methods and apparatuses for carrying out such processing of materials, and the provision of new and improved materials. This application is a division of my application Serial Number 308,002, filed December 7, 1939.

In the drawings accompanying this specification and forming a part of this application, there are shown, for purposes of illustration, several embodiments of apparatus embodying the invention, and in these drawings:

Figure 1 is a more or less diagrammatic view of the relation between material conveying means, grinding means, and separating means, as these means may be utilized in one embodiment of my invention, Figure 2 is a more or less diagrammatic view, particularly showing the fluid connections between parts of the apparatus, Figure 3 is a detail elevational view of the grinder case and one connected single-stage material-projecting gun, Figure 4 is an enlarged longitudinal sectional view of a portion of the gun shown in Figure 3, Figure 5 is a sectional view corresponding to the line 5—5 of Figure 4, Figure 6 is an enlarged sectional view corresponding generally to the line 6—6 of Figure 4, Figure 7 is an enlarged fragmentary sectional view showing certain parts, adapted to provide an air jet, of a gun such as shown in Figures 4 and 6, Figure 8 is an enlarged sectional view through the grinder case, Figure 9 is an enlarged vertical sectional view corresponding generally to the line 9—9 of Figure 8, Figure 10 is an enlarged horizontal sectional view corresponding generally to the line 10—10 of Figure 9, Figures 11, 12, and 13 are sectional views respectively showing different gun arrangements, Figure 14 is a broken sectional view with parts in elevation showing a two-stage gun, Figure 15 is a broken elevation view showing a three-stage gun, Figure 16 is a sectional view showing a multi-stage gun arrangement, Figure 17 is an enlarged sectional view of a portion of Figure 16, Figure 18 is a sectional view corresponding to the line 18—18 of Figure 17, Figure 19 is a broken elevational view of a gun construction comprising adjustable and fixed stages, Figure 20 is a broken elevational view of an embodiment of a gun construction comprising fixed stages only, and Figure 21 is a broken sectional view of another gun arrangement comprising plural opposed guns.

The term "material" is used herein to include any substance of a divided nature, as distinguished from relatively large blocks of substances. The term "grinding" is used herein in its broader aspects as meaning reduction in size, in any way, of the material being treated, and in its more specific aspects, such "grinding" as occurs when material is subjected to impact. Examples of material which may be ground by an apparatus embodying my invention are such materials as zircon, rutile, quartz, feldspar, fluorspar, marble, glass, enameling frit, hard metals, artificial or other abrasives, industrial diamonds, and many others either of similar or different characteristics. My invention is particularly adapted to reduce hard, tough, and abrasive materials, including ores having these characteristics. Also it is particularly adapted to grind material to ultra-fine sizes, such as for example —200 mesh to micron sizes. Preferably the material to be ground should not be larger than 16 to 18 mesh size, although it is possible to accommodate larger sizes. In general the size to be commenced with may be any desirable size which cannot be better or more economically crushed otherwise, but the size of the material to be ground is related to gun size, and therefore also to the capacity of the apparatus. However, the capacity of apparatus embodying my invention is very great in relation to the gun bore area, as will fully appear hereinafter.

Referring to the schematic arrangement shown in Figure 1, the embodiment of the invention there illustrated comprises a container 50 adapted to contain material to be ground, and hereafter referred to as the new-materials container. The new-materials container 50 may be formed with an outlet spout 51 discharging into a funnel 52 carried by the receiving end 53 of an elevating device 54, such as the bucket elevator here shown. A suitable slide valve 55 is interposed in the outlet spout 51 to regulate the flow of material from the new-materials container 50 to the receiving end 53 of the elevator 54. The elevator 54 may be driven by means of an electric motor 56, and may also have a signal device, such as the electric light 57, to indicate when the elevator 54 is operating. The discharge end 58 of the elevator 54 discharges into a conduit 59 leading to a blending and metering hopper 60, having high and low limit controls 61 and 62, so as to control operation of the motor 56 of the elevator 54, the connections being such that the motor 56 of the elevator 54 is automatically started when the level of the material falls enough to actuate the low level device 62, and the motor 56 is automatically stopped when the material rises enough to actuate the high level device 61. The details of the blending hopper 60 and the controls therefor are described in my aforesaid application and, as far as the subject matter of the present application is concerned, these details need not be set forth herein.

Positioned alongside of the receptacle 60 is a second elevator 63, having its inlet end 64 receiving material from the lower end of the hopper 60, as by means of a conduit 65, a suitable slide valve 66 being so interposed as to control the amount of material flowing from the hopper 60. The elevator 63 is driven by an electric motor 67, and may have a signaling device, such as the electric light 68, to indicate when the motor 67 is running. The discharge end 69 of the elevator 63 leads to the inlet of a solids valve 70 the outlet of which communicates with the interior of a charge metering and hoist tank 71. The hoist tank 71 has high and low level devices 72 and 73 respectively, so related to other parts (as described in my aforesaid application) as to permit the motor 67 to operate when the material is below the low level device 73, and to interrupt the circuit of the motor 67 when the material reaches the high level device 72.

A fluid under pressure, in the present instance, air, may be admitted to the hoist tank 71 through a conduit 74, and such air may be released from the hoist tank 71 through either the conduit 74 or a blow-off conduit 75. With material in the hoist tank 71, and air under pressure supplied to the hoist tank 71 through the air conduit 74, the material in the hoist tank 71 is forced to move into the lower end of a tube 219 suitably connected at its upper end to and in communication with a conduit 76, the material continuing through the tube 219, through the conduit 76 to a connection conduit 77 between an air strainer tank 78 and an upper material feed tank 79, a valve 80 being interposed in the connection conduit 77 to permit admission of material to the upper tank 79 and to enable the tank to be placed under fluid pressure. Assuming the valve 80 to be in open position, the material which passes through the conduit 76 is delivered to the connection conduit 77, the air used for hoisting purposes being strained by and vented from the strainer tank 78, and the material dropping into the upper feed tank 79. The conduit 76 is preferably of rubber or rubber lined, and if desired the conduit 76, or the rubber lining thereof, may be continuous with a rubber lining in the tube 219.

The upper feed tank 79 is connected to a lower feed tank 81 by means of a connection conduit 82, a valve 83 being interposed in the connection conduit 82 to permit transfer of material from the upper tank 79 to the lower tank 81, and to enable the lower tank to be maintained under pressure. The lower tank 81 has an outlet conduit 84, a valve 85 being interposed in the outlet conduit 84 for permitting or interrupting the outflow of material from the lower tank 81. Means, shown in Figure 2, is provided for admitting air under pressure to the upper and lower tanks 79 and 81, as will more fully appear.

Assuming that the valve 83 is closed and the valve 85 is open, and assuming also that material is in the lower tank 81, and that this tank is under air pressure, the material from the tank 81 will be forced through the outlet conduit 84, and through a hose conduit 86 to the breach 87 of a gun 88, and through this gun 88 to the grinder case 89, the ground material passing through a conduit 90 to a first separating device 91 of the cyclone type. The surfaces in the device 91 which might be subject to abrasive wear may be suitably lined with rubber. The heavier material in the first separating device 91 may gravitate through a tube 571 against a check valve 92, this valve being so constructed and arranged that a predetermined "head" of material is built up and maintained at the discharge end of the separating device 91, material being permitted to gravitate past the check valve, into the conduit 93, as further material accumulates in the discharge end of the separating device. Any suitable check valve may be used and instances are described in my aforesaid application. The material then continues through the conduit 93 to a funnel 94, and from the funnel 94 to a screen chamber 95 of a screening device 96.

The screening device 96 may be of the vibrating type, having a screen 97 over which the material is shucked, the screen having a certain predetermined mesh size, as for example 200 mesh.

The material which passes through the screen 97 falls into a hopper 98, the outlet of the hopper 98 having a bagging device 99, to which a bag 100 is attached, the bag 100 receiving such material for shipment if desired. For convenience, the bag 100 may be disposed on a platform 101 of a scale 102, so that the amount of material delivered to the bag 100 may be weighed as it is delivered to the bag. That material which does not pass through the screen 97 is discharged from the screen chamber 95 through a conduit 103, and back to the mixing hopper 60. Additional material, from the new materials container 50, may be added to the hopper 60 by means of the elevator 54, the high level device 61 limiting the amount of new material delivered to the hopper 60. In this manner the material removed from the system is automatically replaced with new material from the new materials container 50. The slide valve 55 may be adjusted to a particular flow rate, such rate being determined by the rate at which finished material is removed from the system.

Additional separating means is provided for additionally separating that material which does not gravitate from the first separating device 91, and this means comprises, among other parts, a pump, in this instance a blower fan 104, disposed within a fan chamber 105 and driven by an electric motor 106. The outlet of the fan chamber 105 is branched, one branch 107 leading to the atmosphere, and the other branch 108 being connected to one end of a conduit 109, the opposite end 110 of the conduit 109 leading tangentially into the first separating device 91, if desired in two diametrically disposed tangential branches 110a and 110b. Slide valves 111 and 112 are respectively interposed in the branch conduits 107 and 108, these valves being independently adjustable so as to regulate the amount of air discharged by the blowers through the respective branch, for a purpose to appear.

The upper discharge outlet of the separating device 91 is connected to the inlet of the blower device in this instance certain dechamber 105, and in this connection. Extending from the upper discharge outlet of the first separating device 91 is a separating column, 113, of any suitable cross-sectional form, area, and length, which extends vertically and is connected to a conduit 114 which is tangentially connected to the upper end of a second air separating device 116. Desirably the separating column 113 is enlarged with respect to the conduit 114, and may taper toward its lower end to cause hindered settling. The device 116 may be of the cyclone type, comprising a chamber having an upper cylindrical portion 117 and a downwardly tapering conical portion 118. A bagging device 119 is connected to the lower end of the conical portion 118, and has attached thereto a bag 120 for receiving material gravitating downwardly of the conical portion 118. The upper end of the second separating device 116 is formed with a housing 121 communicating with the interior of the device 116. The housing 121 communicates by means of a conduit 122 with a dust collector or separator 123, which may be of any suitable type. The lower end of the dust separator 123 has attached thereto a bagging device 124, and the air outlet of the dust separator 123 is connected by a conduit 125 to the inlet of the fan chamber 105.

Assuming that the motor 106 is operating, and that the valve 111 is at least partially open, and that ground material, along with air used in grinding it, is being delivered through the conduit 90 to the first separating device 91, the material which under the air conditions prevailing in the separating system is not heavy enough to gravitate at once from the separating device 91, will be picked up by the stream of air in the column 113. Some of this material will continue to be carried by that stream to the top of the column 113 and through the conduit 114 to the upper end of the second separating device 116, and will be caused to swirl in this upper end because of the tangential connection of the conduit 114. The heavier materials in the second separating device 116 will gravitate downwardly through the conical portion 118, and will be delivered to the bag 120 through the bagging device 119. The lighter material will be carried upwardly by the air stream through the housing 121 and the conduit 122, to the dust collector 123, where the dust will be separated from the air, the dust particles being discharged from the bottom of the dust separator 123 and to the bagging device 124, and the air passing to the conduit 125 and back to the inlet of the blower chamber 105. Some of the material which enters the separating column 113 from the separating device 91 does not continue with the upwardly moving stream of air into the conduit 114, but gravitates back through the stream into the separating device 91 and finally reaches the lower or discharge end of the separating device 91, and thus the separating action of the system is improved.

Depending upon the setting of the slide valves 111 and 112, either an under-pressure or an over-pressure condition (with respect to atmospheric pressure) can be made to exist in the first separating device 91. Usually the valve 112 is partially or completely closed, and the valve 111 partially or completely open, so that an under-pressure or partial vacuum exists within the first separating device 91 and in the column 113, whereby material readily passes from the grinder case 89 to the first separating device 91, and no back pressure is created in the conduit 90 leading from the grinder case 89. Also, usually the valves 111 and 112 are adjusted to effect substantially zero (atmospheric) pressure in the grinder case 89, thereby to avoid back pressure in the grinder case 89 that might interfere with the operation of the grinder gun. However, it will be apparent that the pressure conditions in the grinder case and in the separating system can be regulated by adjustment of the slide valves 111 and 112 to obtain any desired pressure conditions. Furthermore, the velocity of the upwardly moving stream of air in the separating column 113 may be adjusted to a most suitable velocity so that the separating function of the column 113 will be optimum.

Since a certain "head" of material is maintained within the tube 571 by the valve 92, air communication between the conduits 93 and the interior of the first separating device 91 is prevented. Thus the pressure condition within the device 91, either greater or less than atmospheric pressure, as may be desired, will not be changed, since the check valve 92, either open or closed, substantially prevents flow of air through the tube 571.

The first separating device 91 may be moved from the position shown in full lines in Figure 1 to the position shown in dotted lines, wherein its lower end no longer communicates with the conduit 93, but instead communicates with a conduit 135 leading to a tank 136, hereinafter referred to as a by-pass tank. The lower end of the tank 136 carries a bagging device 137, to which a bag 138 may be attached, and a check valve 139 is interposed in the conduit 135, the check valve 139 being provided for the same purpose as the check valve 92. In this position of the device 91 the ground material, excepting only a controllable amount and size of very fine material, instead of going to the screen chamber 95, passes directly to the by-pass tank 136. The conduit 113 in this position may still be connected to the conduit 114. The by-pass tank connection is particularly useful when it is desired to make an unscreened ground aggregate, with only a minimum of extreme fines removed.

The fluid pressure system is particularly shown in Figure 2, and in this embodiment uses air as the fluid, although any other suitable fluid may be used. The system comprises an air compressor 145, a conduit 146 leading from the air compressor 145 to an air storage tank 147, and a three-way valve 148 interposed in the conduit 146, the valve 148 in one position establishing communication between the compressor 145 and the storage tank 147, and in another position establishing communication between the storage tank 147 and a tank 149, hereinafter referred to as the waste air tank, the latter tank having safety valves 150 adapted to open at a predetermined pressure, as for example 175 to 185 pounds per square inch.

To start the apparatus initially, the valve 148 is set to establish communication between the air compressor 145 and the storage tank 147, and any desired pressure is built up in the tank 147.

The valve 148 is then turned to establish communication between the storage tank 147 and the waste air tank 149, and air is permitted to flow to the tank 149 until the predetermined pressure is built up in the tank 149. The valve 148 is then turned to its third position, wherein it established communication between the waste air tank 149 and a conduit 152, for a purpose hereinafter explained. A manual control valve 155 may also be interposed in the conduit 146 for controlling the flow of air through the conduit 146, and a pressure indicator 154 may be connected to the conduit 146 ahead of the valve 155. Pressure indicators 156 and 156a may be connected to the waste air tank 149 and to the storage tank 147 respectively.

Leading from the waste air tank 149 is a conduit 159, a valve 160 being interposed in this conduit to permit or interrupt flow of air therethrough, the valve 160 being actuated by means of a solenoid 161. The conduit 159 leads to a manually operable valve 162, preferably of the three-way packed plug cock type, one outlet 163 of the valve 162 leading by means of a conduit 164 to the inlet conduit 74 of the hoist tank 71, and the other outlet 165 leading by means of the conduit 166 to a dust separator 167. The dust separator 167 has an air outlet 168 leading to a muffler 169 for the purpose of muffling the noise of the escaping air, the air passing from the muffler 169 to the atmosphere.

The blow-off conduit 75 of the hoist tank 71 is connected to a conduit 170 through a valve 171 interposed to permit or interrupt the flow of air through the conduits 75 and 170, the valve 71 being actuated by a solenoid 172. The conduit 170 is connected with the conduit 166, and through the conduit 166 with a conduit 173 which leads to one outlet 174 of a manually operable valve 175 which may be of the three-way type in all respects similar to the valve 162. Another outlet 176 of the valve 175 is connected by means of the conduit 152 to the three-way valve 148, while the third outlet 178 is connected by means of a conduit 179 to the upper tank 79, a check valve 180 being interposed in the conduit 179 to permit air to flow only outwardly of the upper tank 79 and to prevent reverse flow.

The present embodiment provides a separate air compressor 181 for supplying air under pressure to the upper and lower tanks 79 and 81. The compressor 181 is connected to a storage tank 182 by a suitable conduit as shown. Extending from the storage tank 182 to the lower tank 81 is a conduit 189 in which are interposed a line cock 183, a line gauge 184, a pressure regulator 185, a three-way meter by-pass 186, another line gauge 187, a stop cock 188, a stop cock 189a to permit and interrupt the flow of air to the tank 81, and a check valve 191 to permit air to flow only into the lower tank 81 and to prevent reverse flow. It will be apparent that the conduit 189 furnishes direct, regulated, and controllable pressure to the tank 81, so that material within the tank 81 will be positively forced out by this direct pressure through the conduit 86 and the gun 88.

A conduit 192 is tapped into the conduit 189 between the regulator 190 and the stop cock 189a, and has a check valve 193 interposed therein to permit air to pass only from the conduit 189 through the conduit 192 and to prevent air from passing from the conduit 192 back to the conduit 189. The conduit 192 is connected to one port 194 of a manually operable valve 195, which may be of the three-way type similar to the valves 162 and 175, a second port 196 of the valve 195 being connected by means of a conduit 197 to the lower tank 81, a pressure indicating device 198 being connected to the conduit 197. The other port 199 of the valve 195 is connected by means of a conduit 200 to the upper tank 79, and a pressure indicating device 201 may be connected to this conduit 200.

Describing generally the pressure system, it will be assumed that material is in the hoist tank 71, but that no material is in the upper and lower feed tanks 79 and 81, and it will also be assumed that the valve 80 in the upper tank is open, and that the valve 83 between the upper and lower tanks 79 and 81, and the valve 85 below the lower tank 81, are closed. The control lever of the valve 162 is turned to the position marked "air input, hoist," so as to permit air under pressure from the waste air tank 149 to flow through the conduit 159, the valve 160 (assuming that this valve is open), the conduits 164 and 74, to the hoist tank 71, and after a predetermined amount of pressure has been built up within the hoist tank 71, the material will be forced through the conduit 76 to the connection conduit 77, and into the upper tank 79. The pressure required to move the material in the hoist tank 71 depends upon the characteristic of the material and the speed at which it is desired to move such material. The air used to move the material to the upper tank 79 is filtered by passage through the air strainer tank 78 and escapes therefrom. After all of the material has been hoisted to the upper tank 79, the operator may turn the control lever of the valve 162 from the "air input, hoist" position to the "blow-off" position, so that the pressure within the tank 71 may be relieved by air flow through the conduit 164, the port 165 of the valve 162, the conduit 166, the dust separator tank 167, the muffler 169, and to atmosphere. The pressure may be relieved automatically by means of the solenoid valve 171, 172, but this is described in my aforesaid application and does not form part of the subject matter of the present application.

During operation of the apparatus, air under pressure is delivered directly to the lower tank 81 by means of the conduit 189. Assuming that the material in the lower tank is low, and that material already has been hoisted to the upper tank 79 in a manner hereinbefore described, and that the valves 80, 83, and 85, are closed, the control lever of the three-way valve 195 is turned to "compress" position, and in this position of the valve 195 air from the conduit 192 passes through the valve 195 and through the conduit 200 to the upper tank 79, and air is thus admitted until the pressure indicator 201 shows that the pressure in the upper tank 79 is substantially equal to that in the lower tank 81. The control lever of the valve 195 is then moved to "equalize" position, whereupon the conduit 192 is shut off, and communication between the tanks 79 and 81 is established by means of the conduit 197, the valve 195, and the conduit 200, so as to insure that the pressure within the lower tank 81 is not greater than that in the upper tank 79. Then the valve 83 is opened to permit the material from the tank 79 to pass to the tank 81. The control lever of the valve 195 may then be moved to "dead" position.

If desired, air under a pressure higher than that within the tanks 79 and 81 may be introduced into the upper tank 79 so as to force the material from the tank 79 into the lower tank 81. To provide for such higher pressure air, a three-way valve 203 may be interposed in the conduit 200, one port 204 of the valve 203 being connected to a conduit 205 tapped into the pressure line 189 ahead of the pressure regulator 190 to receive a higher pressure than exists in the part of the conduit 189 downstream of the regulator. The other ports 206 and 207 of the valve 203 are interposed in the conduit 200. Thus with the valve 203 in position to establish communication between the conduit 205 and the part 200b of the conduit 200, and to cut off communication with the part 200a of the conduit 200, the air under higher pressure in the upper tank 79 will surge to the lower tank 81, and will forcibly remove any remaining material from the tank 79.

When all the material has been delivered to the lower tank 81, the valve 83 is moved to closed position, and the valve 85 is opened, thus feeding material to the gun 88.

To release the pressure in the upper tank 79, the control lever of the valve 175 is moved to a position indicated by the letter a, in which position the air from the upper tank 79 is permitted to move through the conduit 179, the valve 175, the conduit 152, through the valve 148, and to the waste air tank 149, the operator being notified when the maximum pressure in the waste air tank 149 has been reached, either by a signal device, or by the blowing off of the safety valves 150. At this point the operator may move the control lever of the valve 175 to the position indicated by the letter b, so that the remainder of the air under pressure from the upper tank 79 may flow through the conduit 179, the valve 175, the conduit 173, to the dust separator 167, through the muffler 169, and to the atmosphere. After all the air under pressure has been removed from the upper tank 79, the control lever of the valve 175 may be returned to its "dead" position. The valve 80 may then be opened, and material may again be hoisted from the hoist tank 71 to the upper tank 79.

The valve 85 is closed when initially charging the apparatus. Movement of the valve 85 may be effected in any suitable way, as by a chain 381 about a pulley 382, the chain being connected to a lever 385 connected to the plug of the valve. The chain 381 preferably has its operating end positioned adjacent any suitable operating means for the valves 80, 83, as shown in my aforesaid application but not forming part of the subject matter of the present application.

The valve 85 may also be closed or interrupting the process temporarily without relieved pressure on the lower feed tank 81, or at the end of a run prior to a subsequent initial charging or beginning of operations. In other words, it is closed before initially charging, or at the end of a day's run, or for temporary interruption, and it is opened when beginning operations, as at the beginning of a day, or after an interruption as for inspection or adjustment of other equipment.

While the material in the lower feed tank 81 is being ground, the hoist tank 71 will have again been filled, with either new material or with a mixture of new and partly ground material from overage from the screen 96, and this charge will have been hoisted, and all is in readiness to "dump" the same into the tank 81 when the "low level" responsive device in the lower tank 81 indicates sufficient evacuation to receive the next charge from the upper feed tank 79.

From the foregoing description of the apparatus and the operation thereof, it will be apparent that operation of the apparatus and process are enabled to be continuous, but interruptable when desired.

Interlock means may be provided, as described in my aforesaid application, so constructed and arranged that certain parts of the apparatus are permitted to operate only when certain other parts are in a predetermined relation, but these interlock means form no part of the present application.

The valve 85 is interposed in a conduit 386 which has its upper end connected to an outlet tube from the tank 81 and is here shown as having its other end provided with a pair of nipples 387.

In the embodiment shown, one of the nipples 387 of the conduit 386 is closed by means of a cap closure 392, while the other nipple 387 has securely clamped thereto one end of the conduit 86. The conduit 86 comprises a heavy-duty flexible tube 393, (see Figures 3 and 4), within which is disposed a heavy-duty rubber hose 394, having its one end securely fastened over one nipple 387 and its other end 395 (see Figure 4) extending into a union joint 396. The end of the flexible tube 393, adjacent the end 395 of the rubber tube 394, is provided with a coupling device 397 screw-threadedly engaging one end of the union joint, to hold the flexible tube 394 assembled with the union joint. The other end of the union joint 396 screw-threadedly receives one end 399 of an elongated tubular body 400, which forms part of the breach 87 of the gun 88.

The opening of the tubular body 400 adjacent the end 399 is flared outwardly, and receives a metallic funnel-shaped liner 401 preferably formed of cold rolled steel. The bore of the tubular body 400, with the exception of the flared end opening, is uniform in diameter from the end 399 to the other end 402, but at the end 402 the body 400 is formed with an exteriorly threaded reduced extension 403 margining the bore through the tubular body 400. The bore of the tubular body 400 is lined with a material capable of withstanding the abrasive wear produced by the material passing therethrough. In the present embodiment this lining is of tungsten carbide, and in the form of a series of short abutting bushings 404 and a further bushing 405 adjacent the end 402 of the body 400 similar to the bushings 404 but having a tapering bore 406. The opening at that end of the bushing 405 which abuts the adjoining bushing 404 has the same diameter as the opening in this adjoining bushing, while at the opposite end the bore 406 tapers to a reduced diameter as seen at 407. A nut 408 is threaded on the reduced extension 403 of the body 400, suitable packing being interposed between the nut 408 and the adjacent surface of the body 400. The nut 408 has an opening 410 and a counterbore 411, the counterbore being of a size to snugly fit a flanged portion 412 formed on a jet nozzle 413 (see also Figure 7), the jet nozzle herein being formed of tungsten carbide and having a portion extending outwardly of and away from the nut 408, and having a bore substantially equal to the reduced opening 407 of the bushing 405. Herein the jet nozzle 413 also is formed of tungsten carbide. The outer surface 414 adjacent the extremity of the nozzle is preferably so formed as to be defined by a cone of straight line generatrix, a generatrix line thereof making an angle of six degrees with the longitudinal axis of the nozzle.

The body 400 passes through a longitudinal opening in a generally U-shaped member 415, the legs 416 and 417 of the member 415 being spaced apart and rigidly connected by an integral bight 418. The tubular body 400 is formed with external screwthreads 419 at the space between the legs 416 and 417, and a micrometer hand-wheel 420 is threaded onto the threads 419, and has portions slidably bearing against the facing surfaces of the legs 416 and 417, so that rotation of the micrometer wheel 420 will effect longitudinal movement of the body 400 with respect to the member 415. The opening through the leg 416 is provided with an undercut recess 421, receiving the reduced end 422 of a bushing 423, the enlarged end of the bushing 423 being exteriorly knurled, as shown at 424 (Figure 4), and being formed with interior screw-threads for engagement with screw-threads 425 formed on the adjacent part of the tubular body 400. A lock nut 426 is also threaded on the screw-threads 425, and holds the bushing 423 against movement.

The other leg 417 of the member 415 is formed with a reduced axially extending threaded part 427, forming a shoulder 428 with the leg 417. The reduced part 427 is threaded into an aperture formed in a body 429, a gasket being interposed between the shoulder 428 and the adjacent portion of the body 429. The threaded aperture in the body 429 is also reduced as shown at 431, producing a chamber encircling the end 402 and the nut 408 of the tubular body 400, a rubber gasket being interposed between the extremity of the reduced end 427 and the shoulder formed by the reduced opening 431 in the body 429. The body 429 is formed with lateral extensions 433 and 434, each extension being provided with a bore communicating with the chamber formed by the opening 331.

The bore in the extension 433 communicates with a pressure gauge 435 (see Figure 3), while the bore in the extension 434 is connected to a conduit 434a (see Figure 2) which is tapped into the main air pressure conduit 189 ahead of the regulator 190, so that if desired air may be delivered to the bore of the lateral extension 434 under a pressure either higher or lower than that under which the air flows to the lower tank 81, thereby to permit adjustment to secure the optimum qualitative-quantitative output. A manually operated valve 436 is interposed in the conduit 434a to control the flow of air to the bore in the lateral extension 434, and this valve is preferably closed and opened when the valve 85 at the outlet of the lower tank 81 is closed and opened. A regulator may be interposed in the conduit 434a if desired. The opening in the body 429 is further reduced as shown at 437 and threaded as shown at 438, and then enlarged as shown at 439, to receive the correspondingly shaped end of the gun barrel.

Referring particularly to Figure 6, the gun 88 comprises an elongated barrel 440 having an extremity 441 snugly fitting within the reduced opening 437, and a threaded part interengaging with the threads 438 of the body 429. The barrel 440 is then enlarged in outside diameter to provide a portion snugly fitting within the opening 439 and a shoulder for pressing a gasket against the shoulder formed between the openings 438 and 439 of the body 429.

The bore 443 in the barrel 440 is of uniform diameter throughout, with the exception of a flaring recess 444 at the extremity of the barrel 440 adjacent the jet nozzle 413, the walls of the recess 444 being spaced from the adjacent surfaces of the nut 408. The bore 443 of the barrel 440 is preferably lined with a hard liner, herein a series of abutting similar tungsten carbide tubes 445, providing a barrel bore 446 of constant diameter. Some of the bushings 445 may be of a slightly different length, so that by using the right combination of bushings, the exact length of the barrel 440 may be lined. A bushing 447 positioned at the extremity 441 of the barrel 440 is formed with a bore of the same diameter as the bushings 445 but terminating in a conically flared portion, as shown at 448 (see Figure 7), to cooperate with the tapered end 414 of the jet nozzle 413. In the embodiment illustrated, the bore of the jet nozzle 413 is of the same diameter as the bore of the bushing 447, but under certain circumstances it may be desirable to have the bore of the jet nozzle 413 slightly smaller than the bore of the bushing 447. The surface 448 is defined by a straight line generatrix cone a generatrix line thereof preferably making an angle of 7° with the longitudinal axis of the bushing 447, and the surface 448 is adapted to cooperate with the tapered end 414 of the jet nozzle 413 to provide an annular air jet 449 the stream lines of which make a mean angle of about 6½° with the axis of the nozzle 413.

It will be appreciated that the size of the air jet 449 may be very finely adjusted. To effect such adjustment, the lock nut 426 is loosened, and the bushing 423 is backed away from the shoulder provided by the leg 416. Then the micrometer wheel 420 is rotated in the proper direction until the end 414 of the jet nozzle 413 abuts the surface of the tapered opening 448 in the bushing 447. Under these circumstances the air jet 449 is entirely closed, and no air may pass therethrough. The micrometer wheel is provided with radial markings (as may be seen in Figure 5) such as zero at a starting point, and 5 at a mid-point diametrically opposite the zero mark, and also intermediate markings. A pointer or finger 451, carried by the leg 416, cooperates with the markings on the micrometer wheel so that its position may be read.

If it is desired that for the position of the parts in which the air jet 449 is closed the micrometer wheel shall read zero, the markings may be carried by an annular plate 450 which is carried by the wheel 420 and is normally rotatable in unison therewith but is rotatably adjustable with respect to the wheel to the desired position and held in position by screws 450a bearing against a ring 450b in turn bearing against the plate 450. When the micrometer wheel has been adjusted to the zero reading, the bushing 423 is threaded inwardly so as to abut the shoulder provided by the leg 416, the reduced end 422 of the bushing having annular indicator lines 452 on its exterior surface, these lines being interrupted to provide a plurality of clear portions stamped with indicia, such as the letters A, B, C, D, E, and F, to indicate a respective annular line. The lock nut 426 is then drawn up to abut the bushing 423.

To regulate the size of the air jet 449, the micrometer wheel 420 is rotated in a direction opposite to that for closing the air jet 449, so as to back off the tubular body 400, causing separation of the jet tube end 414 from engagement with the flared opening 448 of the bushing 447.

Any given setting may be noted by the position of indicia on the plate 450 with respect to the finger 451, and additionally may be noted by the position of the annular lines 452 on the reduced portion 422 of the bushing 423 with respect to a part of leg 416 of the member 415, such notation being possible by inspection of the letters on the reduced portion 422 through a slot 454 in the leg 416. For instance, the setting A—0 indicates that the air jet 449 is entirely closed; the setting A—5 indicates that the air jet is very slightly open; the setting B—0 indicates that the air jet is open still more, and so on. From known dimensions the jet adjusting means may be readily calibrated so that from any given reading of the indicia on the bushing 423 and on the micrometer wheel the cross-sectional area of the jet 449 at its outlet will be known.

With the manual valve 436 (Figure 2) in open position, additional booster air, at any desired pressure, may pass through the conduit 434a, to the chamber 431, and from there through the air jet 449 in an annular conical stream surrounding the material passing through the bore of the jet nozzle 413, such additional air acting to increase the velocity of the material moving through the bushings 404 and the bushings 445. The pressure within the chamber 431 may be read on the pressure gauge 435.

The end of the barrel 440 opposite to that secured to the body 429, extends through a boss 455 formed on the grinder case 89. Referring particularly to Figures 3 and 8, the grinder case comprises a cylindrical portion 456 and an integral downwardly tapering lower portion 457 terminating in a reduced cylindrical portion 458, the entire interior of the grinder case being preferably lined with rubber 459 to prevent the flying material within the grinder case from abrading the adjacent walls. As indicative of the small size of the apparatus, it may be stated that in the illustrated embodiment of the apparatus the cylindrical portion 456 is about 12 inches in diameter and has an axial length of about 8 inches. The upper open end of the cylindrical portion 456 is closed by a cover 460, the interior surface of which is also lined with rubber 459a. The cover 460 comprises a disk formed with a flange 461 fitting within the walls of the open end of the cylindrical portion 456, the rubber lining 459a engaging an inwardly extending flange 462 on the portion 456. As shown in Figure 3, the marginal edge of the cover 460 is provided with inwardly extending slots 463, adapted to receive the shanks of bolts 464 swingably mounted on the cylindrical portion 456.

The cover 460 is formed with a pair of upwardly extending angularly disposed tube portions 470 and 471, as best seen in Figure 8, the tube portion 470 being closed by a sight glass 472, through which an operator may look into the interior of the grinder case 89. A movable slide 473 is positioned to protect the sight glass 472, the slide 473 being moved to uncover the opening in the tube portion 470 only when it is desired to view the interior of the grinder case 89. The tube portion 471 contains an electric lamp bulb 474, a movable slide 476 being positioned to protect the bulb 474. The interior surfaces of the tube portions 470 and 471, and the inner surface of the slides 473 and 476, are preferably coated with rubber. Any pressure that may exist within the grinder case 89 may be noted by means of a pressure gauge 477.

The gun barrel 440 is provided with an elongated longitudinal groove 480 at that portion where it passes through the boss 455, for the reception of the ends of bolts 481 which hold the gun barrel 440 against both axial and rotative movement. As seen in Figures 8 and 10, the end of the gun barrel 440 within the grinder case 89 has a reduced extremity 482 and a conical portion 483 spaced inwardly from the extremity, a shoulder 484 being provided between the reduced extremity 482 and the conical portion 483. A shield plate 485, herein of tungsten carbide, is secured to the barrel 440 at the conical portion 483, in any suitable manner, to restrict movement of the flying particles of ground material. The tungsten carbide bushings 445 extend to the inner extremity of the barrel 440, and an end bushing 486 extends beyond the extremity, and has its end surrounded by a tungsten carbide collar 487 snugly fitting the extending portion of the bushing 486. The surface of the bushing 445 abutting the adjoining bushing 486 is grooved at its left hand end as shown at 488, this groove communicating with a conduit 489 leading to a pressure gauge 490, so that gun muzzle pressure may be noted. The collar 487 snugly fits within an aperture 491 formed in a ring 492 herein formed of tungsten carbide. An annular housing 493 surrounds and carries the ring 492. The reduced extension 482 of the gun barrel 440 fits within an aperture formed in the annular housing 493.

Diametrically disposed with respect to the boss 455, and extending outwardly from the cylindrical portion 456 of the grinder case 89, is a boss 478, through which extends a tubular body 479, disposed in axial alinement with the gun barrel 440 and formed with an elongated longitudinal groove 494 adapted to receive the ends of bolts 495 to hold the tubular body against both axial and rotative movement. The tubular body 479 has a reduced extremity 496 fitting within an aperture in the annular housing 493, the ring 492 also being apertured at this point to receive a tungsten carbide collar 497. An anvil 498 is slidably disposed in the collar 497. Herein the anvil 498 also is formed of tungsten carbide. The anvil 498 need be of a diameter only about one and one-half to two times the diameter of the opening in the tungsten carbide bushings lining the gun barrel 440. One end of the anvil 498 is directed toward the gun barrel opening, and is spaced a slight distance from the muzzle of the gun barrel, one-half inch to one inch having been found satisfactory under usual circumstances. The other end of the anvil 498 is firmly gripped by an adjusting screw 499 interengaging with screw-threads formed on the interior of the body 479 and having a diametrical slot 500 in its outwardly directed end so that a screw-driver may be inserted in the opening of the tubular body 479 and engage the slot 500 to effect adjustment of the anvil 498 toward or away from the muzzle of the gun barrel 440. The end of the tubular body 479 adjacent the annular housing 493 is also preferably provided with a shield plate 501 to restrict movement of the flying particles of ground material and herein formed of tungsten carbide.

Excellent results have been had with an anvil of the "pencil" type, the diameter of the anvil not greatly exceeding the diameter of the bore of the bushing 486, in the present instance the bore of the bushing 486 (as well as that of the bushings 445) being about .180 of an inch in diameter and the anvil being about ⅜ of an inch in diameter. The end of the anvil, in the present embodiment, is positioned about three-quarters of an inch from the muzzle of the gun barrel, although this distance may be varied, as will be obvious, by adjustment of the screw 499, and in any event preferably the anvil is close enough to the gun muzzle so that no material divergence of the particles occurs before they strike the anvil.

It has been found in practice that an anvil with a perfectly flat surface directed toward the particles expelled by the gun barrel, quite rapidly has formed therein a crater 502 of conoidal form having a small central projection, as best seen in Figure 10. It will be noted that the rim of the crater 502 is defined by the cross-sectional outline of the anvil 498. Once this crater is formed, the wear on the anvil is extremely slight, because the material is ground by impact of particles against particles in the crater. In practice, upwards of a hundred tons of material have been ground without showing any appreciable wear on the anvil. Furthermore, any wear on the anvil is even, that is, the crater 502 remains of substantially uniform shape as wear takes place, and this wear accordingly results in substantially uniform and very slow reduction in length of the anvil portion 498. Such is not the case if the cross-sectional area of the anvil is considerably larger than that of the bore of the gun muzzle. In that case the crater is of composite form usually comprising a central conoidal portion and an annular portion surrounding and more or less concentric with the conoidal portion. Such a composite crater wears more rapidly, and as it wears, the form of the crater varies, and the wear does not result in uniform reduction in length of the anvil.

It may be here stated that the bushings 404 (Figure 6) lining the gun breach are preferably of larger bore than those in the gun barrel 440, a diameter of .250 of an inch having been found satisfactory where the gun barrel bore is .180 of an inch. In any case the absolute size of the bushings 404 and those in the gun barrel 440, as well as in succeeding stages hereinafter described, depends primarily upon the production capacity desired, and upon the maximum size particles to be fed. While there is a limit to the ratio of bore size to particle size beyond which efficiency would not be obtained, this limit is not a practical matter, inasmuch as the capacity of a single gun embodying my invention is tremendous, and if an even greater capacity were desired, it is better to use two or more guns, either impinging the streams against each other or against a fixed anvil or anvils.

The annular housing 493 and ring 492 are additionally supported by a frame 503 comprising vertically extending rods 504 spaced apart and disposed on opposite sides of the ring 492 and annular housing 493, as best seen in Figures 9 and 10. Each rod 503 is provided with a screw-threaded opening for receiving a screw-threaded shank 505, each shank having an enlarged portion 506, and each enlarged portion 506 having secured thereto, as by means of silver solder, a confining disk 507, herein formed of tungsten carbide. The confining disks 507 may be moved toward or away from the respective open ends of the ring 492 by adjustment of the screw-shank 505 with respect to the supporting rod 504, thus providing more or less vent for air and the material being ground in the space within the ring 492. The confining disks 507 prevent the ground material from flying about the interior of the grinder case 89, any kinetic energy remaining after the material has been ground by impact in the crater 502 being largely absorbed by the confining discs 507, so that the ground material may pass through the openings between the disks 507 and the ring 492 and to the bottom of the grinder case 89, or will strike the disks 485 and 501 before so dropping.

Friction nuts 508 are threaded on the respective screws 505, to maintain the screws in adjusted position. The extremity of each screw 505 is formed with a tapered recess 509 receiving the tapered end of an adjustable supporting rod 510. The rods 510 are borne through packings in the cylindrical portion 456 of the grinder case 89 and may be pushed in or pulled out to effect adjustment thereof, each rod being provided with a knurled head 512 manipulable by an operator. Also the rods 510 assist in maintaining the frame 503 in proper position within the grinder case 89.

The ring 492 and annular housing 493 have additional diametrically opposed openings, disposed substantially at right angles to the openings receiving the gun barrel 440 and the tubular body 479, and threaded to receive the reduced threaded ends 513 of tubular bodies 514. The extremity of each reduced end 513 has secured thereto, as by means of silver solder, a disk 515 herein of tungsten carbide, of a diameter slightly smaller than the diameter of the opening in the ring 492. Immediately rearward of the disk 515, each reduced end 513 is formed with an annular groove 516. Radially extending apertures 517, formed in each body 514, communicate with the space provided by the interior of the ring 492, through the slight space between the margin of the disk 515 and the adjacent surface of the opening in the ring 492 and through the annular groove 516, and extend into communication with a bore 518 formed in each tubular body 514. The outer extremity of each bore 518 is closed by a plug 519, and one of these plugs may be apertured to provide communication with a pressure gauge 520, so that the pressure within the ring 492 may be noted. Secured adjacent the outer extremity of each tubular body 514 are cross rods 521 having threaded ends 522 freely passing through apertures in the rods 504, clamp nuts 523 being disposed on opposite sides of the rods 504, and threaded on the ends 522, to clamp the rods 521 in position, and to assist in supporting the tubular bodies 514.

With the exception of parts herein of tungsten carbide, all of the parts within the grinder case 89 which are in any way exposed to the material being ground, preferably are coated with rubber applied in any suitable way.

Figure 11:
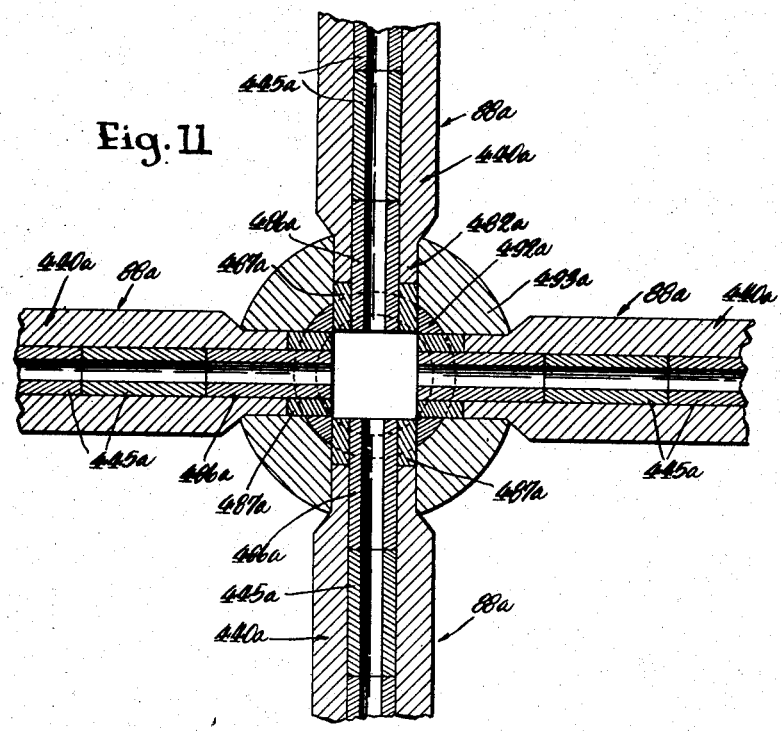

In some cases, for reasons which will more fully appear, it is desirable to project the material and subject it to impact by means of the embodiments shown in Figures 11 through 18. Referring particularly to Figure 11, the gun arrangement therein shown comprises a ring 492a and an annular housing 493a, similar to the ring 492 and annular housing 493 hereinbefore described. As before, the ring 492a and the annular housing 493a are formed with apertures disposed approximately 90° apart, but in this case none of the apertures is formed with threads, but each of the apertures receives a gun 88a, similar to the gun 88 hereinbefore described, each gun 88a cooperating with a gun breach (not shown) similar to the breach 87 already described. Each gun comprises a barrel 440a, the interior of which is lined with bushings 445a herein of tungsten carbide, and each barrel 440a is formed with a reduced end 482a fitting within a respective opening formed in the annular housing 493a, the innermost bushing 486a extending outwardly of the gun barrel 440a and being surrounded by a tungsten carbide collar 487a.

In the construction shown in Figure 11, each gun projects material at high velocity toward the center of the ring 492a, the material thus projected, instead of striking on an anvil as before described, now strikes a counter-stream of material from an oppositely disposed gun, and also strikes a lateral stream of material from a transversely disposed gun. However, two oppositely disposed guns may be omitted, thus providing only one pair of oppositely disposed guns, each projecting a stream of material against a counter-stream projected by the opposite gun.

Figure 12:
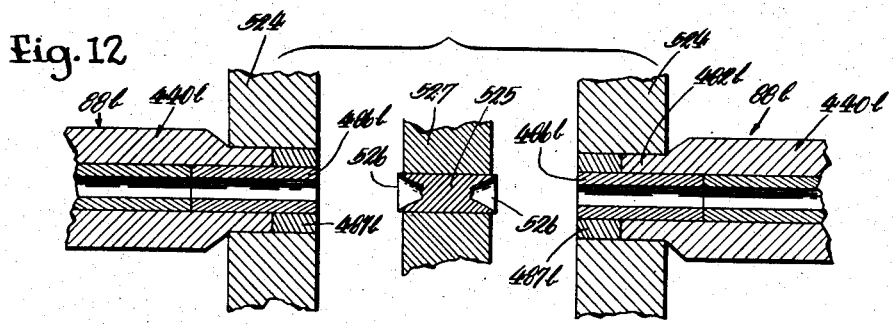

Referring particularly to Figure 12, there is shown a pair of oppositely disposed guns 88b, similar to the guns 88 hereinbefore described, the guns 88b comprising gun barrels 440b having reduced ends 482b disposed within apertures in supports 524. As before, around the extending ends of the innermost bushings 486b are disposed collars 487b herein of tungsten carbide. However, in this embodiment an anvil 525 of tungsten carbide is positioned intermediate the guns 88b, opposite surfaces 526 being directed toward respective gun muzzles. The anvil 525 is shown as having its ends formed with craters such as those formed after the anvil has been in use a short time. The anvil 525 may be supported in any suitable manner in alinement with the gun ends, as for instance by means of a support 527.

Figure 13:
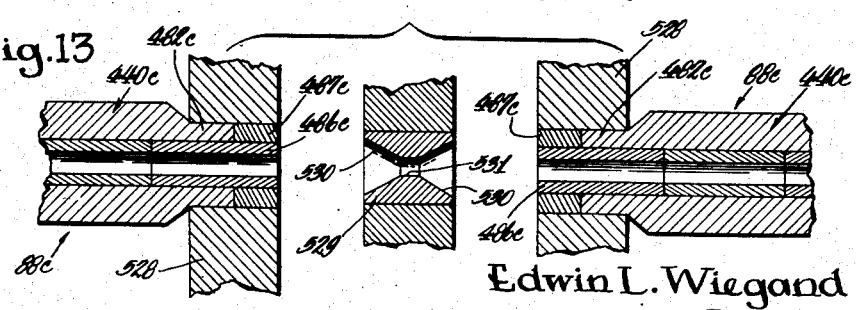

Referring particularly to Figure 13, oppositely disposed guns 88c are provided, each gun being similar in construction to the gun 88 hereinbefore described, and comprising a gun barrel 440c having a reduced end 482c fitting into an opening in a support 528, the extending portion of the innermost bushing 486c, as before, being surrounded by a collar 487c herein of tungsten carbide. In this particular embodiment an anvil 529 of tungsten carbide is disposed in axial alinement with the guns 88c, and is spaced from the outlet of each gun, and is provided in its ends with recesses 530 each tapering to a reduced central aperture 531. The recesses 530 serve the function of a funnel, directing the stream of material from each gun toward the reduced aperture 531 to meet the counter-stream from the opposite gun.

Figure 14 shows what I term a two-stage gun, Figure 15 shows a three-stage gun, and Figures 16 through 18 show a type of gun of more than three stages, although guns of more than three stages may be of the type shown in Figures 14 and 15. By the provision of a plurality of stages I mean the provision of more than one booster jet, such as 449, Figure 7, suitably placed to increase the velocity of the stream of material in the gun barrel means, and for other purposes. The purposes and results of this method of propelling the material through the gun barrel will appear hereinafter.

Referring particularly to Figure 14 the gun construction therein shown provides two successive accelerating jets. The construction comprises a breach 87d, similar to the breach 87 hereinbefore described, having a generally U-shaped member 415d forming legs 416d and 417d connected by an integral bight 418d. A micrometer wheel 420d is provided, as before, for the purpose of adjusting the jet opening 449d, the jet opening receiving a supply of booster air through an opening in a lateral extension 434d. An oppositely disposed lateral extension 433d has an opening leading to a pressure gauge (not shown). The jet 449d discharges into a gun barrel 440d. The bore of the jet nozzle of the jet 449d (corresponding to the jet nozzle bushing 413) is preferably slightly smaller than the bore of the gun 440d, although it may be equal to but preferably not greater than the bore of the bushings corresponding to the bushings 445 and 447.

The gun barrel 440d, instead of extending to the grinder case, extends to another gun breach 87e, in which in this instance the member 415e is generally O-shaped, with legs 416e and 417e having their corresponding ends joined by integral bights 418e. The breach 87e includes an air jet 449e provided by a jet nozzle bushing and a cooperating bushing analogous to the jet nozzle bushing 413 and cooperating bushing 447 of Figure 6. A micrometer wheel 420e provides for adjustment of the air jet 449e. A lateral extension 434e has a bore providing for a supply of additional booster air to the air jet 449e. An oppositely disposed lateral extension 433e has a bore communicating with a pressure gauge (not shown). A gun barrel 440e extends from the breach 87e and leads to the grinder case, similar to the grinder case 89, the gun barrel 440e being similar in construction to the gun barrel 440 hereinbefore described. The jet nozzle of the jet 449e (corresponding to the bushing 413) is preferably of a design no smaller than the preceding bushings, while the subsequent bushings corresponding in function to the bushings 445 and 447 of Figure 6, preferably are the same bore size as that of the preceding jet nozzle, or may be slightly larger, such as 5 to 15% larger than the preceding diameter, depending on the absolute size of the gun bore concerned, although they may be the same as that of the preceding jet nozzle.

Readings of the micrometer wheels 420d and 420e may be taken with reference to pointers 451d and 451e respectively, and the adjustment of the jets 449d and 449e additionally determined as already fully explained in connection with the breach 87 of Figures 4 through 7. The booster air admitted through the bores in the extensions 434d and 434e may be under the same pressure, as for instance 500 pounds per square inch. However, the pressures may be unequal, the pressure of the air through the opening of the extension 434e being, for example, greater than the pressure of the air in the extension 434d. The breach 87e is made of O-shape to provide for pressures of the order of 1000 pounds per square inch.

If desired, another or more breaches similar to the breach 87e shown in Figure 14 may be added in series, thus providing for booster air at a plurality of predetermined places along the gun barrel means. Figure 15 shows an arrangement providing for three stages of booster air. This arrangement uses three gun breaches 87f, 87g, and 87h, the breach 87f being similar to the breach 87 and the breaches 87g and 87h being each similar to the breach 87e of Figure 14, these breaches providing booster jets 449f, 449g, and 449h. The breaches 87f, 87g, and 87h, are connected in series, to constitute part of the gun barrel 440f, 440g, 440h.

In general, with respect to guns of the type illustrated in Figures 14 and 15, the jet nozzle bushings in the stages subsequent to the first stage are preferably of a design no smaller than the preceding bushings, and the subsequent bushings corresponding in functioning to the bushings 445 and 447 of Figure 6 are the same bore size as that of the preceding jet, or may be slightly larger, such as 5 to 15 percent larger than the preceding diameter, depending on the absolute size of the gun bore concerned, although they may be the same as that of the preceding jet.

Figures 16 through 18 show another gun construction also providing for jets of booster air at a plurality of predetermined places along the length of the gun. Referring particularly to Figure 16, the gun therein shown comprises a generally cylindrical body 532 having an enlarged internally threaded head 533 at one end and an externally threaded portion 534 at the opposite end, the body 532 having a central longitudinal bore 535. Extending through the bore 535 is a gun barrel 536 of a smaller diameter than the diameter of the bore 535, providing an annular space 537 extending about the gun barrel 536. Adjacent the end 534, the bore 535 is formed with an annular recess communicating with diametrically extending bores 539 and 540, the bore 539 communicating with a pressure gauge (not shown), and the bore 540 communicating with a conduit leading from a source of booster air. At predetermined spaced intervals along the length of the gun body 536, the gun body is formed with radially extending apertures 541. The gun body 536 is held in position by means of nuts 542 and 543 screw-threadedly engaging the respective ends 533 and 534 of the body 532.

The opening through the gun barrel 536 is lined with bushings herein formed of tungsten carbide, the bushings 544 in those portions of the gun barrel 536 which extend outwardly of the body 532 being generally similar to the bushings 445 hereinbefore described, and the bushings 545 which are disposed within that portion of the gun barrel 536 which lies within the body 532 being each formed as a jet nozzle 546 the exterior surface of which is conical, a straight line generatrix of the cone preferably forming a 6° angle with the longitudinal axis of the bushing. The opposite end 547 of each bushing 545 is formed with an inwardly tapering recess 548 adapted to cooperate with the nozzle 546 of an adjoining bushing, the portions 546 and 547 being so constructed and arranged with respect to each other that the end of the portion 547 abuts a shoulder on the adjacent bushing leaving an air jet passage 549. The generatrix of the conical surface of the recess 548 preferably forms a 7° angle with the longitudinal axis of the bushing. The tapering recess and the tapering conical nozzle are so constructed and arranged that the air jet passage 549 has a mean angle of 6½°. The end 547 of the bushing 545 is formed with radially extending apertures 550, providing communication between the radially extending bores 541 and the air jet passage 549. Referring to Figures 16 and 17, the extreme left end bushing 545a is formed with a jet nozzle 546 only at its right hand end, the other end being plain, to abut an adjacent bushing 544, and the bushing 545b at the extreme right hand end of the body 532 (referring to Figure 16) is provided with a tapering recess 548 only at its left hand end, the opposite end being plain so as to abut the adjoining bushing 544. In some instances to properly aline the bushings 545 with respective radial bores 541, it may be necessary to use small ringlike bushings 551.

In the construction shown in Figures 16 through 18, it will be seen that booster air may enter the bore 540 and traverse the opening 535 in the body 532, pass through the radial openings 541 in the barrel 536, and the openings 550 in the bushings 545, and emerge through the air jets 549 as streams of air surrounding the material passing through the bushings lining the gun barrel 536. In a multi-stage barrel section such as illustrated in Figure 16, the bore is preferably the same throughout.

If desired, a gun construction such as shown in Figures 16 through 18 may be used with any one of the other types of guns preceding it. A gun construction of this type is shown in Figure 19, in which a breach 87i (which may be similar to the breach 87) is connected through a gun barrel portion 440i (which may be similar to the gun barrel portion 440d of Figure 14) to a breach portion 87j (which may be similar to the breach 87e), in turn connected to a gun barrel portion 536a of a multi-stage gun 532a constructed and arranged similarly to the multi-stage gun shown in Figures 16 through 18, so that the bushings therein provide a succession of fixed or non-adjustable stages or points of booster air input, booster air being fed to all of the booster jets through a single inlet pipe 540a, there being also a pipe 539a connectable to a pressure gauge (not shown) on which the pressure within the chamber corresponding to the chamber 538 of Figure 16 may be noted. It will be understood that the gun 532a has a barrel portion 536b (the terminus of which is the muzzle of the gun) of any desired and suitable length. It will be evident that the gun construction shown in Figure 19 provides a desired number of fixed booster stages preceded by a desired number of adjustable booster stages. I have found that a very practical and superior embodiment of a gun construction of the type shown in Figure 19, considering structural and maintenance problems, is obtained with five fixed stages and, as shown, two preceding adjustable stages, particularly when opposed guns are used for the production of the largest amount of ultra-fine material.

Another gun construction is shown in Figure 20, in which a gun 532c, similar to the multistage gun 532a, has its inlet end 536c connected through a union 701 and any suitable pipe connection 702 directly to a material feed conduit 703 which may correspond to the material feed conduit 394, that is, the conduit 703 may lead directly from the feed tank 81 to the gun 532c, there being no adjustable booster air stages interposed. The union 701 is desirably constructed to provide a passage 704 tapering to the inlet of an end bushing 544c of the barrel 536c (corresponding to the left hand end bushing 544 of the barrel 536 of Figure 16). The type of gun illustrated in Figure 20 may be used after the requirements of a specific application have been determined as to size of the input and output material, the hardness and resistance to fracture, specific gravity, and the resultant velocity required to create the desired reduction of the material. Accordingly, the number of booster stages for any given application will depend on the application. The number of booster stages varies from about 5 to about 10, the longitudinal distance between stages being from about 2 inches to about 4 inches. The length of the gun barrel portion 536d may be any suitable length up to about 60 inches with a gun barrel bore of about .180 of an inch. In this type of gun such range of adjustment as may be needed is obtained by adjusting the air input pressure, as well as the solids feed pressure, in order to control to a certain extent the rate, size, and character of the output.

Figure 21 illustrates another type of gun arrangement, in which two guns 705 and 706 are so related that the streams from the muzzles thereof impinge each other at some angle less than 180°, in the illustrated instance 90°. The muzzles of the guns 705 and 706 may be disposed through an annular member 707 corresponding to the annular member 493. The annular member 707, besides having apertures to receive the guns 705 and 706, may be provided with an aperture to receive an anvil carrying member 708 similar to the member 479, the axis of the member 708 bisecting the angle between the streams from the guns 705 and 706, and an anvil 709 carried by the member 708 being disposed approximately at the place of impingement of the streams.

The material ground in the grinder case 89 (see Figure 8) gravitates down the rubber-lined sides 457 to the reduced outlet 458 and thence through the conduit connection 90 to the first separating device 91, this connection including a fitting 552 (see Figure 3) to which is attached one end of a flexible hose 553 the opposite end of which is attached to an inlet pipe 554 of the first separating device 91. As shown in Figure 1, the first separating device 91 has another inlet pipe 555 directly below the inlet pipe 554, but the inlet pipe 555 in this instance is closed by a cap 556. If desired, the inlet pipe 555 may lead to another grinder case, the tank 91 in such instance serving both grinder casings, or the pipe 555 may be used as an inspection opening.

Returning now to a consideration of the methods by which the material is ground, I have used with excellent results a gun having a bore of .180 of an inch, provided with a single accelerating jet, and having a length from the accelerating jet to the muzzle of the gun of approximately 54 inches. It will be noted that in this instance the area of the bore is approximately .025 of a square inch, and since the length, is 54 inches, the ratio of inch length to square inch area of bore is approximately 2100. However, also I have used with excellent results a gun having the same bore area and a barrel length of 44 inches, the ratio of inch length to square inch bore area being in this instance approximately 1700. A further example is a gun of the same bore area but having a length of 10 inches, in which instance the aforesaid ratio is approximately 390. These examples are given as illustrative, and it is to be understood that my invention is not limited to these particular dimensions or ratios, and in fact at least part of my purposes may be accomplished when the aforesaid ratio is as low as approximately 200.

In considering the action of a single stage gun, that is, a gun having a single accelerating jet, constructed in accordance with my invention, the mixed stream of material and air which enters the bore of the bushing 447 (Figures 6 and 7) may be conceived theoretically as a core which is surrounded by the internal surface of an annular stream provided by the jet 449. This annular stream at the moment it issues from the jet aperture is moving at a much greater velocity than the core, and acts to impart its velocity to the immediately adjacent outer suface elements of the core, and these in turn act to impart their velocity to the elements of the core radially inward of the core. Obviously the center of the core will not acquire the velocity of the annular stream instantaneously, or for an appreciable period or distance, and the acceleration of the core is rendered more difficult because the solid material in the core accelerates less rapidly than the air. Under these conditions, it is evident that acceleration of the core must take place, at least initially, largely by application of force at the outer surface of the core. However, if the diameter of the core is increased, the area and content of the core increases as the square of the radius, whereas the circumference increases only as the first power of the radius. Thus for a gun having a bore twice as large as another, the theoretical surface at which accelerating force is initially applied is approximately twice as large, whereas the core which is being accelerated has an area and a mass approximately four times as large. As far as the foregoing considerations are concerned, obviously it is highly desirable that the core be relatively small, or in other words, that the bore of the gun be relatively small, particularly if the gun is a single stage gun. However, the jet must have a substantial kinetic energy, which presumably can be secured at given pressure adjustment to a suitable jet area, or at a given jet area by adjustment to a suitable pressure of the booster air, or by some combination of the two. It seems that increase of the jet area would involve greater penetration of the annular jet into the core, but however that may be, I have found that within limits which will be referred to, an increase of jet area is beneficial, and seems to involve a more positive impelling action of the jet on the core than is involved in considering the jet as impelling the core merely by the theoretical inner annular surface of the jet along the theoretical outer surface of the core. Nevertheless, I have found that there is an optimum relation between the area of the jet and the area of the gun bore.

In a gun of more than one stage the bore of the gun may be made larger than for a gun of a lesser number of stages, but I have not found the use of relatively larger bores necessary, because with a plurality of stages the velocity of the material, the fineness of the product, the production, and the efficiency, may be still further increased even with a gun bore no larger than that of a single stage gun. Obviously this is exceedingly important, for example in respect of the weight and expense of the equipment, particularly the cost of the parts made of tungsten carbide or other suitable wear-resisting material. However, before discussing plural stage guns further, there may be considered results I have obtained on the single stage guns.

For example, I have obtained the following results using a gun having a bore diameter of .180 of an inch and a length of 54 inches from the jet 449 to the muzzle of the gun barrel 440, the stream being directed against an anvil such as the anvil 498. The positive pressure behind the stream, as furnished by the air under pressure in the feed tank 81, was approximately 500 to 550 pounds per square inch, and air was fed to the jet 449, through the connection 434, also at a pressure of approximately 500 to 550 pounds per square inch. The solid material fed from the feed tank 81 was zircon ($ZrSiO_4$) of —60 mesh comprising substantially no particles of −200 mesh. The jet 449 was so adjusted that the cross-sectional area thereof at its outlet into the gun barrel was approximately 40 percent of the cross-sectional area of the gun barrel bore 446. These conditions resulted in a feed of solid material through the gun of approximately 1092 pounds per hour. The quantity of free air compressed and used per ton of solids feed, was approximately 12,250 cubic feet. The ratio of the volume of solid material to the volume of the mixture of compressed air and solid material comprising the stream projected from the gun muzzle, was 2.15 percent. The material was passed through the gun once, with the results shown in the following table, Number I, in which for each minus mesh size produced there is given in column A the number of pounds thereof prodused per hour, and in column B the cubic feet of free air which was compressed and used per ton produced:

*Table Number I*

| Mesh | A | B |
| --- | --- | --- |
| −200 | 514 | 14,700 |
| −270 | 443 | 17,050 |
| −300 | 372 | 19,700 |
| −325 | 348 | 21,700 |
| −400 | 295 | 25,600 |

In connection with these results it may be observed that zircon is not only very hard and abrasive but also very tough, and these characteristics render its impact resistance high and make it difficult to grind. Furthermore, it is well known that it is extremely difficult to further grind or pulverize materials which are already relatively fine, due to the fact that the impact energy decreases while the resistance to fracturing remains approximately constant. By way of example, it is more difficult to break down by impact to half its volume a material particle in the range of 200 mesh and finer than it is in the coarser ranges.

It seems that in a single stage gun the optimum ratio between the cross-sectional area of the accelerating jet, and the cross-sectional area of the gun bore, is approximately 40 to approximately 50 percent. In general, the net result of putting more than a certain limited amount of energy into the gun at one point, is that entrainment of solids is seriously reduced, that is, the feed of solids is decelerated, and the consumption of air per ton of feed is too greatly increased to be economical. In fact, with too high an energy input at a single point of the gun, the solids feed may even be choked off.

However, I have found that this difficulty may be overcome by using successive jets, at points spaced longitudinally of the gun, each jet having a desired cross-sectional area and being supplied at a desired pressure, so that the stream is permitted to increase in velocity before a second accelerating jet acts on the stream to further increase its velocity, and so on. With such a gun the solids feed to the gun is not choked off nor materially reduced, even with high gas pressures, and can be regulated to a desired richness of solids-gas mixture merely by regulating the pressure on the multiple jets and the pressure on the feed tank 81. Moreover, it is possible to get results quite out of proportion to increase in pressure, and in fact, the use of high pressure is made possible, and the advantages thereof are realized, without resulting in choking off or seriously reducing the solids feed. With such a gun the maximum gas pressure and velocity appear to be limited only by construction problems. Furthermore, great gun barrel length is made possible without introducing offsetting disadvantages, thereby overcoming excess "slip" of the solids in the gas stream.

I have further found that in a plural stage gun, even if the sum of the cross-sectional areas of the successive jets be no more or not substantially more than the cross-sectional area of the optimum size jet for a single stage gun, and even if the bore of the plural stage gun be no different than that of a single stage gun, yet the results produced are far superior. Furthermore, I have found that in a plural stage gun the ratio of the sum of the cross-sectional areas of the jets to the cross-sectional area of the gun bore may be increased much beyond the optimum ratio for a single stage gun, in fact the ratio may approach and even exceed 100 percent, without substantial impediment of the solids feed. The respective jet pressures need not be the same as the positive pressure on the stream at the breach of the gun, but may be either higher or lower, depending upon the jet opening which happens to work best at a particular point, the important thing being (a) the total energy supplied at that point, and (b) remaining within limits of the maximum desirable jet opening area for a single stage which in turn depends on the velocity and particle energy state existing at that point.

The gist of a principle underlying my invention is the applying of energy in controlled stages dependent upon various limitations, particularly the particle energy state existing at a particular point in the gun barrel, and that again is the result of the velocity, size, shape, and specific gravity, of the material particles, existing at that particular point. If it is endeavored to boost too much, either by way of jet area or by way of pressure, the result may be instead to decelerate and interfere.

An example of the functioning of a two stage gun is afforded by results obtained on a gun of the type shown in Figure 14 which had a bore diameter of .180 of an inch and in which the gun barrel portion 440e had a length from the jet 449e to the muzzle of the portion 440e of approximately 34 inches. The length of the gun portion 440d from the jet 449d to the jet 449e was approximately 20 inches. The stream from the muzzle of the gun was directed against an anvil such as the anvil 498. In one of the runs the jets had a combined area of approximately 56 percent of the gun bore, the jet 449d being set so that its area was approximately 16% of the area of the gun bore, and the jet 449e being set so that its area was approximately 40% of the area of the gun bore. The air supplied to the gun from the tank 81, and the air supplied to the jets 449d and 449e, was at a pressure of approximately 500 to 540 pounds per square inch. The solid material fed to the gun was the same kind of material as in the case of the single stage gun hereinbefore referred to, and there resulted a feed of approximately 1865 pounds per hour. The quantity of free air compressed and used per ton of solids feed was approximately 7517 cubic feet. The ratio of the volume of solid material to the compressed air and solids mixture volume, was approximately 3.54%. The material was passed through the gun once, with the results shown in the following table, Number II, in which the columns have the same meaning as in Table Number I:

*Table Number II*

| Mesh | A | B |
|---|---|---|
| −200 | 947 | 14,760 |
| −270 | 756 | 18,510 |
| −300 | 638 | 21,940 |
| −325 | 619 | 22,600 |
| −400 | 535 | 26,200 |

An example of the functioning of a three stage gun is afforded by results obtained on a gun of the type shown in Figure 15, having a bore of .180 of an inch. The gun barrel portion 440$h$ was approximately 34 inches from the jet 449$h$ to the muzzle of the gun, the gun barrel portion 440$g$ was approximately 10 inches from the jet 449$g$ to the jet 449$h$, and the gun barrel portion 440$f$ was approximately 10 inches from the jet 449$f$ to the jet 449$g$. The stream from the muzzle of the gun was directed against an anvil such as the anvil 498. In one of the runs the combined area of the jets was approximately 78 percent of the gun bore area, the jets 449$f$, 449$g$, and 449$h$, being so set that their areas were approximately 20 percent, 24 percent, and 34 percent, respectively, of the area of the gun bore. The air supplied to the gun from the tank 81, and the air supplied to the jets 449$f$, 449$g$, and 449$h$, was at a pressure of approximately 500 to 550 pounds per square inch. The solid material fed to the gun was the same kind of material as in the case of the single stage gun test hereinbefore referred to, and there resulted a feed of approximately 2280 pounds per hour. The quantity of the air compressed and used per ton of solids feed was approximately 5530 cubic feet. The ratio of the volume of solid material to the compressed air and solids mixture volume was approximately 4.76 percent. The material was passed through the gun once, with the results shown in the following table, Number III, in which the columns have the same meaning as in Table Number I:

*Table Number III*

| Mesh | A | B |
|---|---|---|
| −200 | 1,070 | 11,900 |
| −270 | 861 | 14,800 |
| −300 | 734 | 17,300 |
| −325 | 689 | 18,500 |
| −400 | 597 | 21,300 |

The power consumption to produce the foregoing results of course is that required to compress the air, and by way of example, in the case of the two-stage gun, the power consumption was approximately as follows:

55 KWH per ton of −200 mesh
   82 KWH per ton of −300 mesh
   85 KWH per ton of −325 mesh
   98 KWH per ton of −400 mesh It is of course evident from a comparison of Table Number III with Table Number II that the air consumption and power consumption per ton of each size of product was materially less in the case of the three-stage gun than in the case of the two-stage gun. Furthermore, as the number of stages is increased, in general the hourly production rate is materially increased, even though the gun is neither longer nor of greater bore.

Perhaps the greatest difficulties in grinding hard materials have been rapid wear and damage to the grinding means, and the introduction into the product of added material from grinding means. Such added material from the grinding means is hereinafter referred to as additions. The introduction of additions into the product is undesirable in most instances. An example is zircon, ground by a prior art method, which had a bluish gray color, a relatively low electrical resistivity, and a lowered fusing point, due to metallic iron inclusion. These defects render the zircon unsuitable for use for example as a refractory electrical insulating material particularly at elevated temperatures. It is sometimes attempted to remove the additions or other impurities by treatment with chemicals, but this necessitates subsequent removal of the chemicals, and also, is not necessarily successful, and in fact, may leave not only the previous impurities but also some of the chemicals used in the treatment, besides being cumbersome and expensive. With my method and apparatus substantially no additions are introduced into the product, and most existing impurities are removed, as will be pointed out hereinafter, so that the product requires no subsequent treatment.

While zircon, which has a hardness of about 7 to 7½ (Mohs' scale), has been hereinbefore used as an example of the grinding of hard materials, it is of course to be understood that materials of substantially any hardness may be ground to great fineness without contamination. This is due in part to the fact that the gun is so constructed and arranged that it may be and is lined with tungsten carbide or other suitable wear-resisting material, in all portions where material wear might occur, and is due in part to the provision and continuance by the accelerating jet or jets of a protecting sheath of air between the surface of the gun bore and the material-carrying stream. However, the construction and arrangement of the anvil, and mode of cooperation of the anvil and the projected stream of material, whereby there is substantially no wear of the anvil, also is a material factor in preventing contamination.

My invention is particularly useful in the grinding of the harder materials, of hardness 4 or more (Mohs' scale), and will readily and efficiently grind such materials for example to −200 mesh with less than 1/50% additions, to −325 mesh with less than 1/40% additions, and to −400 mesh with less than 1/25% additions. In fact, my apparatus will grind readily and efficiently with substantially no additions whatever. For example, with apparatus embodying my invention I have ground 100 tons of zircon (about 12 cubic feet to the ton) with loss from the grinding apparatus of 1/50 of one cubic inch, which represents additions carried into the material from the grinding apparatus of approximately one part in one hundred million, and even of this minute amount, part is removed with impurities previously present in the material. In fact, not only are there substantially no additions that would contaminate the product, but, as set forth in my aforesaid application, the material may be so ground that the greatest fraction of the ground product contains less impurities than the raw material, or substantially no impurities.

My apparatus is particularly well adapted for use where different degrees of impact are desired, particularly because of the great flexibility of adjustment, whereby substantially any desired degree of impact may be secured. Furthermore, the apparatus may be calibrated for different materials and different impacts, so that it may be readily adjusted and re-adjusted when changing from the processing of one material to another.

Naturally, in general the plural stage guns are most flexible, by reason of the adjustability of the stages, and with any given gun I may vary the pressure from lower amounts up to pressures of the order of 500 to 1000 pounds per square inch, or even higher, adjusting the amount of air admitted to the breach of the gun and to the accelerating jets respectively to secure the desired grinding quality and quantity. Of course the length of the gun may also be varied, as hereinbefore set forth, to suit particular conditions.

In general, the results desired determine the manner of use, form, and adjustment, of the apparatus. Generally speaking, criteria are maximum hourly production rate of fines in general or fines of any particular mesh, minimum air consumption per ton produced, minimum rehandling of the material, minimum wear of active parts, minimum contamination of the product with material from the equipment, minimum size and weight of equipment, minimum cost of equipment relative to production rate of desired output, universality of application from softest to hardest and most abrasive material, ease of control of texture and fineness of desired product, continuity of the process, safety in manipulating high pressures and from dust, and capacity for further reduction of originally very fine materials, and all of these criteria are satisfied with my invention.

If it is desired to produce aggregates having a relatively uniform division of screen analysis from the maximum to the minimum, I prefer a gun of any desired number of stages, projecting the material against a fixed anvil. This produces a more uniform texture of sharp angular particles, with a minimum of extreme fines. The gun and anvil combinations may be multiplied as desired, and operated in parallel. On the other hand, if it is desired to produce a maximum amount of extreme fines, it is best to use plural opposed guns, that is, two or more guns the streams from which impinge each other.

My invention makes practical the use of opposed guns. With guns in accordance with my invention, combining positive fluid pressure feed of solids with accelerating jet means, I am able to lengthen the barrels of the guns to get maximum velocity, and also to oppose the guns, even head on, without impairing the solids feed. Furthermore, I am enabled to place opposed guns within a very short distance from each other without creating enough additional back-pressure to materially affect the feed rate, whether the arrangement comprises two or more opposed guns. Such close spacing enables me to project a number of solids streams against each other at very close range, avoiding spreading of the solids streams, thereby maintaining great concentration of the kinetic energy of the solids streams.

Thus, my invention enables control of the grinding texture so that a relative minimum or relative maximum of extreme fines can be obtained, depending on whether the impact is against a fixed anvil or against a counter-stream directly or at some desired angle less than 180°.

My invention is particularly adapted for the production of finely divided abrasives, not only because by use thereof hard abrasive materials may be ground, but because the resultant particles comprising the finely divided product have sharp edges, rendering the product more effective in use as an abrasive.

While I have shown annular conical jets for applying the booster air, my invention includes other jet means suitable for the purpose. Also, while I have mentioned tungsten carbide for various parts particularly subject to wear, my invention includes any suitable wear-resisting material, for example metallic carbides such as the carbides of tungsten, tantalum, titanium, boron, or combinations thereof, and in any form, and for any parts as may be desired. Also my invention contemplates pressures up to one thousand or fifteen hundred pounds per square inch or even higher.

From the foregoing it will be apparent to those skilled in the art that each of the illustrated methods and apparatuses embodying my invention provides a new and improved method, or a new and improved apparatus, respectively, for carrying out the processing of materials, and each of the illustrated products embodying my invention provides a new and improved product, and accordingly, each of the methods and apparatuses and products accomplishes a principal object of my invention. On the other hand, it also will be obvious to those skilled in the art that the illustrated embodiments of my invention may be variously changed and modified, and features thereof, singly or collectively, embodied in combinations other than those illustrated, without departing from the spirit of my invention or sacrificing the advantages thereof, and accordingly, that the disclosure herein is illustrative only, and that my invention is not limited thereto.

I claim:

1. In combination: a casing; a ring-like member disposed in said casing and having an aperture extending from an outer peripheral surface portion of said member through an inner peripheral surface portion thereof; gun means for projecting a stream of fluid and material to be ground, said gun means having a portion disposed through said casing and having its muzzle extending into said aperture; anvil means disposed in said ring-like member; said gun means and said anvil means being relatively so constructed and arranged that said stream impinges said anvil means; jet means constructed and arranged to introduce fluid into the bore of said gun means to accelerate said stream; a tank for containing material to be ground; means for introducing fluid under pressure into said tank; conduit means, connecting said tank to the breech of said gun means, constructed and arranged to feed material under fluid pressure from said tank to said breech; a source of fluid under pressure; and conduit means connecting said source to said jet means.

2. In combination: a casing; a ring-like member disposed in said casing and having circumferentially spaced apertures extending from outer peripheral surface portions of said member through inner peripheral surface portions thereof; gun means for projecting streams of fluid and material to be ground, said gun means having portions disposed through said casing and having their muzzles extending into said apertures respectively; said gun means being relatively so constructed and arranged that said streams impinge each other; jet means constructed and arranged to introduce fluid into the bores of said gun means to accelerate said streams respectively; tank means for containing material to be ground; means for introducing fluid under pressure into said tank means; conduit means, connecting said tank means to the breeches of said gun means, constructed and arranged to feed material under fluid pressure from said tank means to said breeches; a source of fluid under pressure; and conduit means connecting said source to said jet means.

3. Impact pulverizing apparatus constructed and arranged to effect pulverization by projecting a stream of material particles at high velocity and subjecting them to impact, comprising a pulverizing chamber, a barrel having an inlet for the particles to be projected and a relatively long substantially straight bore extending from said inlet to an outlet remote from said inlet, means constructed and arranged to positively propel particles to be projected, into and through said bore and into said chamber, means constructed and arranged to feed into said bore intermediate its length a succession of forwardly directed jets of gas or vapor under pressure of at least two hundred pounds per square inch, spaced longitudinally of said bore to permit expansion of the gas or vapor entering at one jet, and resultant increase in velocity of the stream, before the stream reaches the succeeding jet, and acting therefore to substantially increase the velocity at which said particles are projected, and means whereby the projected particles are subjected to impact within said chamber thereby to disrupt said particles at least in part.

4. Impact pulverizing apparatus constructed and arranged to effect pulverization by projecting a stream of material particles at high velocity and subjecting them to impact, comprising a pulverizing chamber, a barrel having an inlet for the particles to be projected and a relatively long substantially straight bore extending from said inlet to an outlet remote from said inlet, means constructed and arranged to feed a composite stream of gas or vapor under pressure of at least two hundred pounds per square inch, and particles to be projected, into and through said bore and into said chamber, means constructed and arranged to feed into said bore intermediate its length a succession of forwardly directed jets of gas or vapor under pressure of at least two hundred pounds per square inch, spaced longitudinally of said bore to permit expansion of the gas or vapor entering at said inlet, and resultant increase in velocity of the stream, before the stream reaches the first jet, and expansion of the gas or vapor entering at one jet, and resultant further increase in velocity of the stream, before the stream reaches the succeeding jet, and acting therefore to substantially increase the velocity at which said particles are projected, and means whereby the projected particles are subjected to impact within said chamber thereby to disrupt said particles at least in part.

5. Impact pulverizing apparatus constructed and arranged to effect pulverization by projecting a stream of material particles at high velocity and subjecting them to impact, comprising a pulverizing chamber, a barrel having an inlet for the particles to be projected and a relatively long substantially straight bore extending from said inlet to an outlet spaced from said inlet a distance not less than approximately two hundred inches per square inch of bore cross-section, means constructed and arranged to positively propel particles to be projected, into and through said bore and into said chamber, means constructed and arranged to feed into said bore intermediate its length a succession of forwardly directed jets of gas or vapor under pressure of at least two hundred pounds per square inch, spaced longitudinally of said bore to permit expansion of the gas or vapor entering at one jet, and resultant increase in velocity of the stream, before the stream reaches the succeeding jet, and acting therefore to substantially increase the velocity at which said particles are projected, and means whereby the projected particles are subjected to impact within said chamber thereby to disrupt said particles at least in part.

6. Impact pulverizing apparatus constructed and arranged to effect pulverization by projecting a stream of material particles at high velocity and subjecting them to impact, comprising a pulverizing chamber, a barrel having an inlet for the particles to be projected and a relatively long substantially straight bore extending from said inlet to an outlet spaced from said inlet a distance not less than approximately two hundred inches per square inch of bore cross-section, means constructed and arranged to feed a composite stream of gas or vapor under pressure of at least two hundred pounds per square inch, and particles to be projected, into and through said bore and into said chamber, means constructed and arranged to feed into said bore intermediate its length a succession of forwardly directed jets of gas or vapor under pressure of at least two hundred pounds per square inch, spaced longitudinally of said bore to permit expansion of the gas or vapor entering at said inlet, and resultant increase in velocity of the stream, before the stream reaches the first jet, and expansion of the gas or vapor entering at one jet, and resultant further increase in velocity of the stream, before the stream reaches the succeeding jet, and acting therefore to substantially increase the velocity at which said particles are projected, and means whereby the projected particles are subjected to impact within said chamber thereby to disrupt said particles at least in part.

7. Impact pulverizing apparatus constructed and arranged to effect pulverization by projecting a plurality of streams of material particles at high velocity and subjecting them to collision, comprising a pulverizing chamber, a pair of barrels each having an inlet for the particles to be projected therefrom and a relatively long substantially straight bore extending from said inlet to an outlet remote from said inlet, means constructed and arranged to positively propel particles to be projected, into and through said bores and into said chamber, means constructed and arranged to feed into each of said bores intermediate its length at least one forwardly directed jet of gas or vapor under pressure of at least two hundred pounds per square inch and acting to substantially increase the velocity at which said particles are projected, and means mounting said barrels so that the particles projected from the one of said bores and the particles projected from the other of said bores are projected into and collide in said chamber, at a departure from opposite direction of not more than approximately ninety degrees, thereby to disrupt said particles at least in part.

8. Impact pulverizing apparatus constructed and arranged to effect pulverization by projecting a plurality of streams of material particles at high velocity and subjecting them to collision, comprising a pulverizing chamber, a pair of barrels each having an inlet for the particles to be projected therefrom and a relatively long substantially straight bore extending from said inlet to an outlet remote from said inlet, means constructed and arranged to feed composite streams of gas or vapor under pressure of at least two hundred pounds per square inch, and particles to be projected, into and through said bores and into said chamber, means constructed and arranged to feed into each of said bores intermediate its length at least one forwardly directed jet of gas or vapor under pressure of at least two hundred pounds per square inch, spaced longitudinally of said bore to permit expansion of the gas or vapor entering at said inlet, and resultant increase in the velocity of the stream, before the stream reaches said jet, and acting to substantially increase the velocity at which said particles are projected, and means mounting said barrels so that the particles projected from the one of said bores and the particles projected from the other of said bores are projected into and collide in said chamber, at a departure from opposite direction of not more than approximately ninety degrees, thereby to disrupt said particles at least in part.

9. Impact pulverizing apparatus constructed and arranged to effect pulverization by projecting a plurality of streams of material particles at high velocity and subjecting them to collision, comprising a pulverizing chamber, a pair of barrels each having an inlet for the particles to be projected therefrom and a relatively long substantially straight bore extending from said inlet to an outlet spaced from said inlet a distance not less than approximately two hundred inches per square inch of bore cross-section, means constructed and arranged to positively propel particles to be projected, into and through said bores and into said chamber, means constructed and arranged to feed into each of said bores intermediate its length at least one forwardly directed jet of gas or vapor under pressure of at least two hundred pounds per square inch and acting to substantially increase the velocity at which said particles are projected, and means mounting said barrels so that the particles projected from the one of said bores and the particles projected from the other of said bores are projected into and collide in said chamber, at a departure from opposite direction of not more than approximately ninety degrees, thereby to disrupt said particles at least in part.

10. Apparatus for grinding material by impact, comprising: a pulverizing chamber; gun barrel means for receiving into the bore thereof a stream of material and fluid under pressure of the order of two hundred pounds or more per square inch, and for projecting said material into said chamber; first means for discharging into said gun barrel means a jet of fluid under pressure of the order of two hundred pounds or more per square inch, constructed and arranged to accelerate said stream; and second means for discharging into said gun barrel means a jet of fluid under pressure of the order of two hundred pounds or more per square inch, constructed and arranged further to accelerate said stream, said second means being spaced from said first means in the direction of said stream a distance having a dimensional order of approximately two hundred or more inches per square inch of the cross-sectional area of said bore; and means for subjecting material projected from said gun barrel means to impact in said chamber.

11. Apparatus for grinding material by impact, comprising: gun barrel means for receiving into the bore thereof a stream of material and fluid under pressure of the order of two hundred pounds or more per square inch; first means for discharging into said gun barrel means a jet of fluid under pressure of the order of two hundred pounds or more per square inch, constructed and arranged to accelerate said stream; and second means for discharging into said gun barrel means a jet of fluid under pressure of the order of two hundred pounds or more per square inch, constructed and arranged further to accelerate said stream, said second means being spaced from said first means in the direction of said stream a distance having a dimensional order of approximately two hundred or more inches per square inch of the cross-sectional area of said bore; and an anvil, having a cross-sectional diameter transverse to said stream approximately one and one-half to approximately two and one-half times the diameter of said bore, against which said high velocity stream is projected.

12. Apparatus for grinding material by impact, comprising: an anvil having a portion of substantially uniform cross-section terminating in an impact surface, and gun means, for projecting a stream of material against said surface, having a bore generally not larger in cross-section than approximately one-eighth square inch, the direction of said stream being substantially coaxial with said portion, and the transverse dimensions of said portion being at least approximately one and one-half times the transverse dimensions of said bore, and said surface being spaced from the end of said bore a distance not more than approximately five times the average transverse dimension of said bore, whereby wear of said portion by reason of impact of material will produce a crater which remains of substantially uniform shape.

13. Apparatus for grinding material by impact, comprising: an anvil having a portion of substantially uniform cross-section terminating in an impact surface, and gun means, for projecting a stream of material against said surface, having a bore generally not larger in cross-section than approximately 1600 times the average cross-section of the larger particles of the material, the direction of said stream being substantially coaxial with said portion, and the transverse dimensions of said portion being at least approximately one and one-half times the transverse dimensions of said bore, and said surface being spaced from the end of said bore a distance not more than approximately five times the average transverse dimension of said bore, whereby wear of said portion by reason of impact of material will produce a crater which remains of substantially uniform shape.

14. Apparatus for grinding material by impact, comprising: an anvil having a portion of substantially uniform cross-section terminating in an impact surface, and gun means, for projecting a stream of material against said surface, having a bore generally not larger in cross-section than approximately one-eighth square inch, the direction of said stream being substantially coaxial with said portion, and the transverse dimensions of said portion being approximately one and one-half to two and one-half times the transverse dimensions of said bore, and said surface being spaced from the end of said bore a distance approximately three to five times the average transverse dimension of said bore, whereby wear of said portion by reason of impact of material will be substantially uniform over the area of said surface.

15. Apparatus for grinding material by impact, comprising: an anvil having a portion of substantially uniform cross-section terminating in an impact surface, and gun means, for projecting a stream of material against said surface, having a bore generally not larger in cross-section than approximately 1600 times the average cross-section of the larger particles of the material, the direction of said stream being substantially coaxial with said portion, and the transverse dimensions of said portion being approximately one and one-half to two and one-half times the transverse dimensions of said bore, and said surface being spaced from the end of said bore a distance approximately three to five times the average transverse dimension of said bore, whereby wear of said portion by reason of impact of material will be substantially uniform over the area of said surface.

16. The method of pulverizing particles of material, effecting pulverization by projecting a stream of material particles at high velocity and subjecting them to impact, and using a barrel having an inlet for the particles to be projected and a relatively long substantially straight bore extending from said inlet to an outlet remote from said inlet, comprising positively propelling particles to be projected, into and through said bore and into a pulverizing chamber, feeding into said bore intermediate its length a succession of forwardly directed jets of gas or vapor under pressure of at least two hundred pounds per square inch, spaced longitudinally of said bore to permit expansion of the gas or vapor entering at one jet, and resultant increase in velocity of the stream, before the stream reaches the succeeding jet, and acting therefore to substantially increase the velocity at which the particles are projected, and subjecting the projected particles to impact.

17. The method of pulverizing particles of material, effecting pulverization by projecting a stream of material particles at high velocity and subjecting them to impact, and using a barrel having an inlet for the particles to be projected and a relatively long substantially straight bore extending from said inlet to an outlet remote from said inlet, comprising feeding a composite stream of gas or vapor under pressure of at least two hundred pounds per square inch, and particles to be projected, into and through said bore and into a pulverizing chamber, feeding into said bore intermediate its length a succession of forwardly directed jets of gas or vapor under pressure of at least two hundred pounds per square inch, spaced longitudinally of said bore to permit expansion of the gas or vapor entering at said inlet, and resultant increase in velocity of the stream, before the stream reaches the first jet, and expansion of the gas or vapor entering at one jet, and resultant further increase in velocity of the stream, before the stream reaches the succeeding jet, and acting therefore to substantially increase the velocity at which the particles are projected, and subjecting the projected particles to impact.

18. The method of pulverizing particles of material, effecting pulverization by projecting a stream of material particles at high velocity and subjecting them to impact, and using a barrel having an inlet for the particles to be projected and a relatively long substantially straight bore extending from said inlet to an outlet spaced from said inlet a distance not less than approximately two hundred inches per square inch of bore cross-section, comprising positively propelling particles to be projected, into and through said bore and into a pulverizing chamber, feeding into said bore intermediate its length a succession of forwardly directed jets of gas or vapor under pressure of at least two hundred pounds per square inch, spaced longitudinally of said bore to permit expansion of the gas or vapor entering at one jet, and resultant increase in velocity of the stream, before the stream reaches the succeeding jet, and acting therefore to substantially increase the velocity at which the particles are projected, and subjecting the projected particles to impact.

19. The method of pulverizing particles of material, effecting pulverization by projecting a stream of material particles at high velocity and subjecting them to impact, and using a barrel having an inlet for the particles to be projected and a relatively long substantially straight bore extending from said inlet to an outlet spaced from said inlet a distance not less than approximately two hundred inches per square inch of bore cross-section, comprising feeding a composite stream of gas or vapor under pressure of at least two hundred pounds per square inch, and particles to be projected, into and through said bore and into a pulverizing chamber, feeding into said bore intermediate its length a succession of forwardly directed jets of gas or vapor under pressure of at least two hundred pounds per square inch, spaced longitudinally of said bore to permit expansion of the gas or vapor entering at said inlet, and resultant increase in velocity of the stream, before the stream reaches the first jet, and expansion of the gas or vapor entering at one jet, and resultant further increase in velocity of the stream, before the stream reaches the succeeding jet, and acting therefore to substantially increase the velocity at which the particles are projected, and subjecting the projected particles to impact.

20. The method of pulverizing particles of material, effecting pulverization by projecting a plurality of streams of material particles at high velocity and subjecting them to collision, and using a pair of barrels each having an inlet for the particles to be projected therefrom and a relatively long substantially straight bore extending from said inlet to an outlet remote from said inlet, comprising positively propelling particles to be projected, into and through said bores and into a pulverizing chamber, feeding into each of said bores intermediate its length at least one forwardly directed jet of gas or vapor under pressure of at least two hundred pounds per square inch and acting to substantially increase the velocity at which the particles are projected, and mounting said barrels and projecting said particles so that the particles projected from the one of said bores and the particles projected from the other of said bores collide within said chamber, at a departure from opposite direction of not more than approximately ninety degrees.

21. The method of pulverizing particles of material, effecting pulverization by projecting a plurality of streams of material particles at high velocity and subjecting them to collision, and using a pair of barrels each having an inlet for the particles to be projected therefrom and a relatively long substantially straight bore extending from said inlet to an outlet remote from said inlet, comprising feeding composite streams of gas or vapor under pressure of at least two hundred pounds per square inch, and particles to be projected, into and through said bores and into a pulverizing chamber, feeding into each of said bores intermediate its length at least one forwardly directed jet of gas or vapor under pressure of at least two hundred pounds per square inch, spaced longitudinally of said bore to permit expansion of the gas or vapor entering at said inlet, and resultant increase in the velocity of the stream, before the stream reaches said jet, and acting to substantially increase the velocity at which the particles are projected, and mounting said barrels and projecting said particles so that the particles projected from the one of said bores and the particles projected from the other of said bores collide within said chamber, at a departure from opposite direction of not more than approximately ninety degrees.

22. The method of pulverizing particles of material, effecting pulverization by projecting a plurality of streams of material particles at high velocity and subjecting them to collision, and using a pair of barrels each having an inlet for the particles to be projected therefrom and a relatively long substantially straight bore extending from said inlet to an outlet spaced from said inlet a distance not less than approximately two hundred inches per square inch of bore cross-section, comprising positively propelling particles to be projected, into and through said bores and into a pulverizing chamber, feeding into each of said bores intermediate its length at least one forwardly directed jet of gas or vapor under pressure of at least two hundred pounds per square inch and acting to substantially increase the velocity at which the particles are projected, and mounting said barrels and projecting said particles so that the particles projected from the one of said bores and the particles projected from the other of said bores collide within said chamber, at a departure from opposite direction of not more than approximately ninety degrees.

23. The method of grinding material by impact, which comprises providing a substantially straight stream of material and fluid under pressure, confined to a diameter such that said stream has a dimensional order of two hundred or more inches of stream length per square inch of stream cross-sectional area, and while said stream is so confined, subjecting said stream to at least one accelerating jet of fluid under pressure, thus to accelerate said stream, and projecting said stream into a pulverizing chamber and subjecting the material to impact in said chamber.

24. The method of grinding material by impact, which comprises providing a laterally confined substantially straight stream of material and fluid under pressure, and while said stream is so confined, subjecting said stream to at least one accelerating jet of fluid under pressure, spaced along said stream a distance of the order of two hundred or more inches per square inch of stream cross-sectional area, thus to accelerate said stream, and projecting said stream into a pulverizing chamber and subjecting the material to impact in said chamber.

25. The method of grinding material by impact, which comprises providing a substantially straight stream of material and fluid under pressure, confined to a diameter such that said stream has a dimensional order of two hundred or more inches of stream length per square inch of stream cross-sectional area, and while said stream is so confined, subjecting said stream to a succession of accelerating jets of fluid under pressure, thus to accelerate said stream, and projecting said stream into a pulverizing chamber and subjecting the material to impact in said chamber.

26. The method of grinding material by impact, which comprises providing a substantially straight stream of material and fluid under pressure of at least approximately two hundred pounds per square inch, confined to a diameter such that said stream has a dimensional order of two hundred or more inches of stream length per square inch of stream cross-sectional area, and while said stream is so confined, subjecting said stream to at least one accelerating jet of fluid under pressure of at least approximately two hundred pounds per square inch, thus to accelerate said stream, and projecting said stream into a pulverizing chamber and subjecting the material to impact in said chamber.

27. The method of grinding material by impact, which comprises providing a substantially straight stream of material and fluid under pressure of at least approximately two hundred pounds per square inch, confined to a diameter such that said stream has a dimensional order of two hundred or more inches of stream length per square inch of stream cross-sectional area, and while said stream is so confined, subjecting said stream to a succession of accelerating jets of fluid each under pressure of at least approximately two hundred pounds per square inch, thus to accelerate said stream, and projecting said stream into a pulverizing chamber and subjecting the material to impact in said chamber.

28. The method of grinding solid material of a hardness of four or more mho, by impact, comprising projecting the material, from gun means having a bore generally not larger in cross-section than approximately one-eighth square inch and not shorter than approximately two hundred inches per square inch of cross-sectional area, by fluid under pressure of the order of two hundred pounds or more per square inch, into a pulverizing chamber, into impact in said chamber.

29. The method of grinding solid material of a hardness or four or more mho, by impact, comprising projecting the material, from gun means having a bore generally not larger in cross-section than approximately one-eighth square inch and not shorter than approximately two hundred inches per square inch of cross-sectional area, by fluid under pressure of the order of two hundred pounds or more per square inch, into a pulverizing chamber, into impact in said chamber, and accelerating the material by introducing into said bore a succession of jets of fluid each under pressure of approximately two hundred pounds or more per square inch.

30. The method of grinding solid material of a hardness of four or more mho, by impact, comprising projecting the material, from gun means having a bore generally not larger in cross-section than approximately 1600 times the average cross-section of the larger particles of the material and not shorter than approximately two hundred inches per square inch of cross-sectional area, by fluid under pressure of the order of two hundred pounds or more per square inch, into a pulverizing chamber, into impact in said chamber.

31. The method of grinding solid material of a hardness of four or more mho, by impact, comprising projecting the material, from gun means having a bore generally not larger in cross-section than approximately 1600 times the average cross-section of the larger particles of the material and not shorter than approximately two hundred inches per square inch of cross-sectional area, by fluid under pressure of the order of two hundred pounds or more per square inch, into a pulverizing chamber, into impact in said chamber, and accelerating the material by introducing into said bore a succession of jets of fluid each under pressure of approximately two hundred pounds or more per square inch.

EDWIN L. WIEGAND.